US012138816B2

(12) United States Patent
Werner et al.

(10) Patent No.: US 12,138,816 B2
(45) Date of Patent: Nov. 12, 2024

(54) ADJUSTABLE BLADE ASSEMBLY HAVING MAGNETIC TENSIONING

(71) Applicant: Andis Company, Sturtevant, WI (US)

(72) Inventors: Edwin Alen Werner, Union Grove, WI (US); Richard J. Tringali, Racine, WI (US); Ervin Titzkowski, Mount Pleasant, WI (US); Joseph Novak, Milwaukee, WI (US); Jeffrey D. Gross, Kenosha, WI (US)

(73) Assignee: Andis Company, Sturtevant, WI (US)

(*) Notice: Subject to any disclaimer, the term of this patent is extended or adjusted under 35 U.S.C. 154(b) by 0 days.

(21) Appl. No.: 17/950,563

(22) Filed: Sep. 22, 2022

(65) Prior Publication Data

US 2023/0023892 A1 Jan. 26, 2023

Related U.S. Application Data

(63) Continuation of application No. 16/541,775, filed on Aug. 15, 2019, now Pat. No. 11,504,864.

(60) Provisional application No. 62/830,829, filed on Apr. 8, 2019, provisional application No. 62/719,281, filed on Aug. 17, 2018.

(51) Int. Cl.
*B26B 19/06* (2006.01)
*B26B 19/28* (2006.01)
*B26B 19/38* (2006.01)

(52) U.S. Cl.
CPC .............. *B26B 19/06* (2013.01); *B26B 19/28* (2013.01); *B26B 19/38* (2013.01)

(58) Field of Classification Search
CPC ......... B26B 19/06; B26B 19/28; B26B 19/38; B26B 19/205; B26B 19/3846
USPC ........................................................ 30/43.92
See application file for complete search history.

(56) References Cited

U.S. PATENT DOCUMENTS

| | | | | |
|---|---|---|---|---|
| 658,094 A * | 9/1900 | Palmer | .................... | B26B 19/24 30/220 |
| 4,059,891 A | 11/1977 | Panagiotoulis | | |
| 4,989,324 A | 2/1991 | Andis | | |
| 7,234,242 B2 | 6/2007 | Yao | | |

(Continued)

FOREIGN PATENT DOCUMENTS

| | | |
|---|---|---|
| CN | 101432104 | 5/2009 |
| CN | 102909733 | 2/2013 |

(Continued)

OTHER PUBLICATIONS

CN 104369216 Translation (Year: 2023).*

(Continued)

*Primary Examiner* — Nhat Chieu Q Do
(74) *Attorney, Agent, or Firm* — Reinhart Boerner Van Deuren s.c.

(57) ABSTRACT

A hair clipper or cutter is provided with an adjustment slider that adjusts the gap between an inner and outer blade. A yoke is attached to the inner blade. The adjustment slider may be configured with preset gap lengths and may be adjustable before, after, or during a hair cutting operation. A T-guide couples the adjustment slider to the inner blade to slidably move the inner blade relative to the outer blade. The yoke, inner blade, outer blade and/or T-guide may be magnetized to create an attractive or repulsive force between the inner blade and the outer blade.

16 Claims, 27 Drawing Sheets

(56) References Cited

U.S. PATENT DOCUMENTS

| | | | | |
|---|---|---|---|---|
| 8,341,846 | B1 | 1/2013 | Holmes | |
| 9,943,972 | B2 | 4/2018 | Werner | |
| 2007/0107234 | A1 | 5/2007 | Yao | |
| 2009/0019706 | A1 * | 1/2009 | Werner | B26B 19/3813 30/233.5 |
| 2009/0199413 | A1 | 8/2009 | Tautscher et al. | |
| 2013/0312265 | A1 | 11/2013 | Wilson et al. | |
| 2014/0117788 | A1 | 5/2014 | Takahashi et al. | |
| 2016/0075039 | A1 * | 3/2016 | Werner | B26B 19/06 30/200 |
| 2017/0019044 | A1 | 1/2017 | Godlieb et al. | |
| 2017/0348865 | A1 | 12/2017 | Werner | |
| 2023/0219246 | A1 * | 7/2023 | Xiang | B26B 19/386 30/43.92 |

FOREIGN PATENT DOCUMENTS

| | | | | |
|---|---|---|---|---|
| CN | 203185375 | | 9/2013 | |
| CN | 104128936 | | 11/2014 | |
| CN | 204054091 | U * | 12/2014 | |
| CN | 104369216 | A * | 2/2015 | |
| CN | 204913971 | | 12/2015 | |
| CN | 106103018 | | 11/2016 | |
| CN | 108274496 | | 7/2018 | |
| CN | 208196865 | U * | 12/2018 | |
| EP | 1974875 | | 10/2008 | |
| EP | 1974875 | A1 * | 10/2008 | B26B 19/06 |
| JP | S54-103159 | | 8/1979 | |
| JP | 2009-535143 | | 10/2009 | |
| KR | 20120005629 | A * | 1/2012 | |
| WO | WO2017/120610 | | 7/2017 | |

OTHER PUBLICATIONS

Translation CN 204054091 (Year: 2024).*

International Searching Authority, "International Search Report and Written Opinion," issued in connection with International Patent Application No. PCT/US2019/046656, 13 pages.

Partial Supplementary European Search Report for European Application No. 19850550.5, dated Mar. 18, 2022, 10 pages.

Machine Translation of EP1974875 generated by Patent Translate at https://translationportal.epo.org/emtp/translate/?ACTION=description-retrieval&COUNTRY=EP&ENGINE=google&FORMAT=docdb&KIND=A1&LOCALE=en_EP&NUMBER=1974875&OPS=ops.epo.org/3.2&SRCLANG=de&TRGLANG=en, 8 pages.

* cited by examiner

ADJUSTABLE BLADE ASSEMBLY HAVING MAGNETIC TENSIONING

CROSS-REFERENCE TO RELATED PATENT APPLICATIONS

The present application is a continuation of U.S. application Ser. No. 16/541,775, filed Aug. 15, 2019, and issued as U.S. Pat. No. 11,504,864 on Nov. 22, 2022, which claims the benefit of and priority to U.S. Provisional Application No. 62/830,829, filed on Apr. 8, 2019, and U.S. Provisional Application No. 62/719,281, filed on Aug. 17, 2018, which are incorporated herein by reference in their entireties.

BACKGROUND OF THE INVENTION

The present invention relates generally to the field of hair clippers or a hair cutting apparatus. The present invention relates specifically to an adjustable tensioning assembly configured to adjust a blade gap between a reciprocating blade and a stationary blade of a blade assembly. The present invention also relates to a magnetic tensioning assembly configured to provide tension between a reciprocating blade and a stationary blade of the blade assembly.

SUMMARY OF THE INVENTION

One embodiment of the invention relates to a magnetic blade assembly. The magnetic blade assembly includes a first blade, a second blade, and a blade guide assembly. The first blade has a first blade edge having a plurality of teeth. The second blade has a second blade edge having a plurality of teeth. The second blade edge is parallel to the first blade edge and the blades oscillate relative to one another. The blade guide assembly is captured between the first and second blades and maintains a relative position of the first blade edge relative to the second blade edge. The blade guide includes a guide member and a magnetic assembly. The guide member has a base and a cross-portion, the cross-portion is captured between the first and second blades and has a first side adjacent to the first blade and a second side adjacent to the second blade. The magnetic assembly includes a plurality of magnets extending along the cross-portion of the guide member between the first and second blades to generate an attractive force between the blade guide assembly and the first blade.

Another embodiment of the invention relates to a magnetic blade assembly. The magnetic blade assembly includes an outer blade, an inner blade, and a blade guide assembly. The outer blade has an outer blade edge with a plurality of teeth. The inner blade has an inner blade edge with a plurality of teeth. The inner blade edge is parallel to the outer blade edge and the inner blade oscillates over the outer blade. The blade guide assembly is captured between the inner blade and outer blade and maintains a relative position of the inner blade edge relative to the outer blade edge as the inner blade oscillates over the outer blade. The blade guide assembly includes a T-shaped guide member and a magnetic assembly. The T-shaped guide member has a base and a cross-portion. The cross-portion is captured between the inner blade and the outer blade and has an inner section adjacent to the inner blade and an outer portion adjacent to the outer blade. The magnetic assembly has a plurality of magnets disposed on the inner section of the cross-portion between the guide member and the inner blade that generates a magnetic attractive force between the blade guide assembly and the inner blade.

Another embodiment of the invention relates to a blade assembly that includes an inner blade, an outer blade, and a blade guide assembly. The inner blade has an inner blade edge with a plurality of teeth. The outer blade has an outer blade edge with a plurality of teeth that is parallel to the inner blade edge. The inner blade oscillates over the outer blade. The blade guide assembly is captured between the inner and outer blades. The blade guide assembly has a guide member, an adjustable gap assembly, and a diagonal slot mechanism. The guide member has a base and a cross-portion captured between the inner and outer blades. The adjustable gap assembly is in the guide member and extends along the cross-portion of the guide member between the inner and outer blades. The adjustable gap assembly generates a force between the blade guide assembly and the inner blade that maintains a relative position of the inner blade edge relative to the outer blade edge. The diagonal slot mechanism is coupled to the base of the guide member and the adjustable gap assembly. Movement of the diagonal slot mechanism in a direction parallel to the inner and outer blade edges moves the cross-portion of the guide member perpendicular to the inner and outer blade edges such that a gap between the inner blade edge and the outer blade edge increases or decreases based upon movement of the diagonal slot mechanism in a direction parallel to the inner and outer blade edges.

Alternative exemplary embodiments relate to other features and combinations of features as may be generally recited in the claims.

BRIEF DESCRIPTION OF THE DRAWINGS

This application will become more fully understood from the following detailed description, taken in conjunction with the accompanying figures, wherein like reference numerals refer to like elements in which.

DETAILED DESCRIPTION

Figure 1:
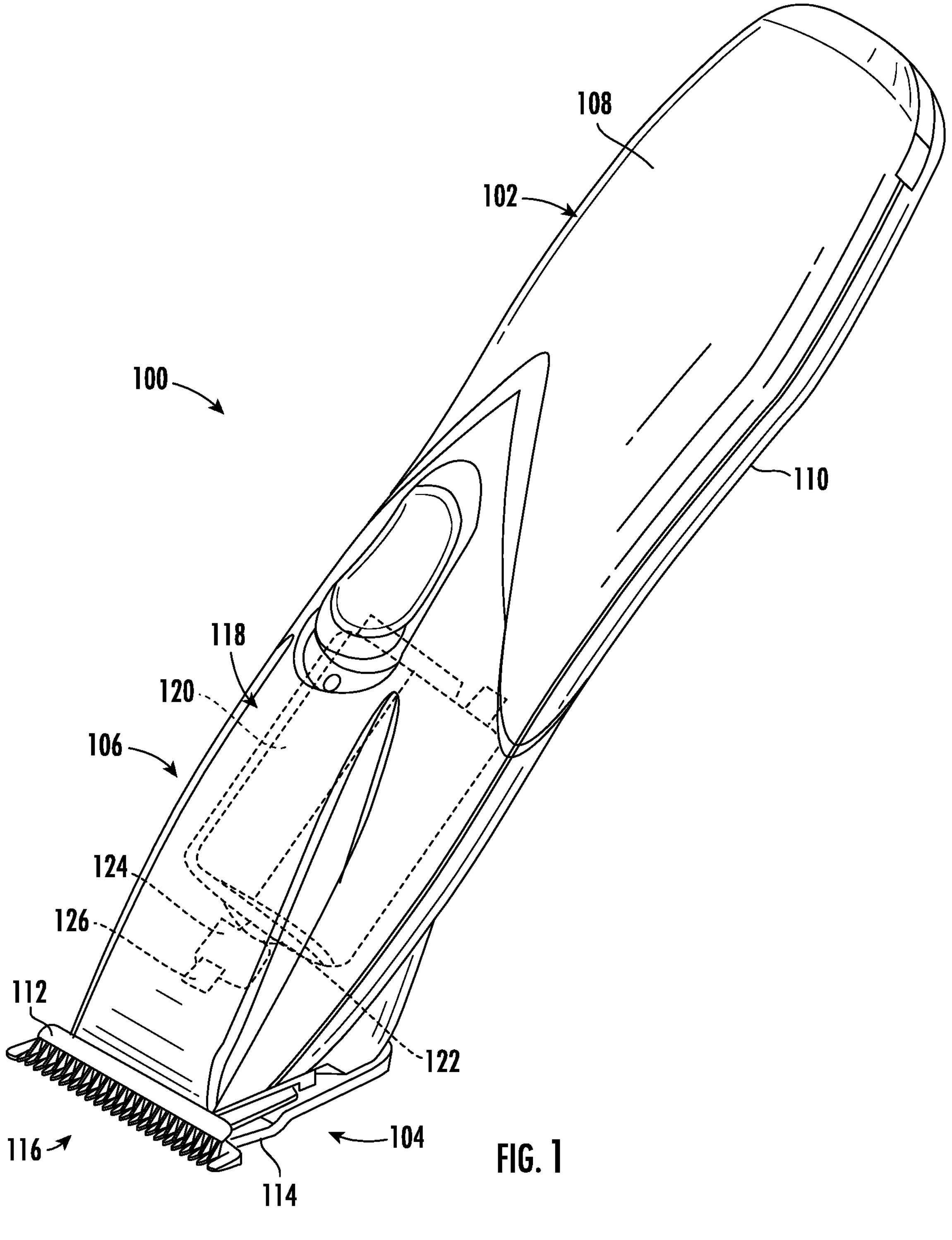
FIG. 1 is a perspective view of a hair cutting device, according to an exemplary embodiment.

Referring generally to the figures, various embodiments of hair cutters or clippers are shown. The cutters include a blade assembly with an upper or inner blade that oscillates over a lower or outer blade to cut or trim hair. The alignment or gap of an edge of the inner blade relative to an edge of the outer blade affects the cut hair length. For example, if the outer blade has a surface that decreases along the length of the blade, moving the inner blade relative to the outer blade will change the length of hair that is cut. In order to adjust the gap created between the cutting end of the teeth on the inner blade and the cutting end of the teeth on the outer blade an adjustment slider or selector mechanism couples to the inner blade and moves the cutting end of the inner blade relative to the outer blade. This movement extracts or retracts the blades, which enlarges or diminishes a gap between the cutting ends of the inner and outer blades. Controlling the size of the gap enables an operator to adjust the desired cut length that the clippers will cut hair.

Proper tensioning between the blades reduces friction on the system, wear and tear on the blades, and enhances the operational life of the motor. The inner and outer blade should be tensioned/pulled together so that the oscillation of the inner and outer teeth do not interfere with the cutting ends of the blades. A guide member such as a T-guide that is formed by including an arm on the inner blade enables the inner and outer blades to oscillate while retaining the desired tensile force (e.g., with a spring or other biasing mechanism).

Applicant has found that using a magnetic force to generate a tensioning force between the inner and outer blades reduces friction between the blades, which reduces load on the motor and improves overall efficiency of the system. For example, a guide member situated between the upper and the lower blade (e.g., inner and outer blade) is magnetized, includes magnets, or includes an electromagnetic system that creates an attractive force between the blades and reduces the friction of oscillation of the inner blade. In some embodiments, the system detects the load or speed of the motor or blades and increases or decreases the electromagnetic attractive force to minimize the load.

Combining the T-guide with a guide rail or cross-portion and arm or body having a diagonal slot mechanism enables the operator to select a gap between the cutting edges of the inner and outer blades to cut hair at a desired length. This configuration enables the operator to selectively adjust the blade set before, during, or after operation. The operator is able to select the relative closeness of the cut without having to detach the blade set and realign the blades manually. Pre-set detents within the diagonal slot or along the adjustment slider form predetermined gaps associated with desirable cut lengths. The adjustment slider moves between the detents to a selected and fixed hair cutting length (e.g., a predetermined length of cut).

For ease of discussion and understanding, the following detailed description will refer to and illustrate the blade assembly that incorporates magnetic tensioning and/or blade set adjustment in association with a hair cutting apparatus or "cutter." It should be appreciated that a "cutter" is provided for purposes of illustration, and the blade assembly disclosed herein can be used in association with any hair cutting, hair trimming, or hair grooming device. Accordingly, the term "cutter" is inclusive, and refers to any hair grooming device including, but not limited to, a hair trimmer, a hair clipper, or any other hair cutting or hair grooming device. The cutter device can be suitable for a human, animal, or any other living or inanimate object having hair.

FIG. 1 illustrates an example embodiment of a hair cutting apparatus, trimmer, clipper, or cutter 100. Cutter 100 includes a body 102, a blade set or blade assembly 104, and a drive assembly 106. As illustrated in FIG. 1, body 102 is hand-held and includes a clamshell configuration of two portions: a first or upper housing 108 and a second or lower housing 110 (e.g., on a top and bottom of cutter 100). Cutter 100 body 102 may include other configurations. For example upper housing 108 and/or lower housing 110 form a single integral body 102 or component part. Body 102 could join housing 108 and/or housing 110 in other clamshell configurations (e.g., from one or more sides) and may include additional parts on the top, bottom, sides, or ends of body 102. Blade assembly 104 includes a translating, upper, or inner blade 112 and a stationary, lower, or outer blade 114. Body 102 and housing 108 and/or 110 define a cutting end 116 that includes blade assembly 104. Body 102 further defines a cavity 118 to support a motor 120. As illustrated in FIG. 1, cavity 118 is formed from a clamshell configuration of upper housing 108 and lower housing 110 such that body 102 surrounds drive assembly 106 and motor 120 coupled to blade assembly 104.

Drive assembly 106 is positioned within cavity 118 and couples blade assembly 104 to motor 120. As illustrated, motor 120 is a rotary DC electric motor 120. In other embodiments, motor 120 is a pivot motor or a magnetic motor 120 that generates oscillating or reciprocating movement for blade assembly 104. In other embodiments, motor 120 is an AC electric motor or any other suitable motor for generating oscillating or reciprocating movement for a blade assembly 104, e.g., inner blade 112 and/or outer blade 114. As illustrated, motor 120 is configured to operate on battery power (e.g., cordless), but may be configured to operate with electricity from any suitable electric source, e.g., a corded cutter 100 plugged into an outlet.

Motor 120 couples to a rotating motor output shaft 122 that rotates about a rotational axis. An eccentric drive 124 is coupled to motor output shaft 122 and rotates eccentrically about the rotational axis. Eccentric drive 124 includes an eccentric shaft 126 that is offset from motor output shaft 122. In other words, eccentric shaft 126 is offset from the axis of rotation of motor 120, such that eccentric shaft 126 rotates non-concentrically around the axis of rotation to create an oscillatory rotational motion. Eccentric shaft 126 is configured to engage a yoke 128 (FIG. 2) of blade assembly 104 and translate or oscillate inner blade 112 linearly. Blade assembly 104 is coupled to cutting end 116 of the body 102. For example blade assembly 104 may couple to body 102 with an adhesive, a rivet, a weld, a bolt, a screw, or at least one fastener.

Figure 2:
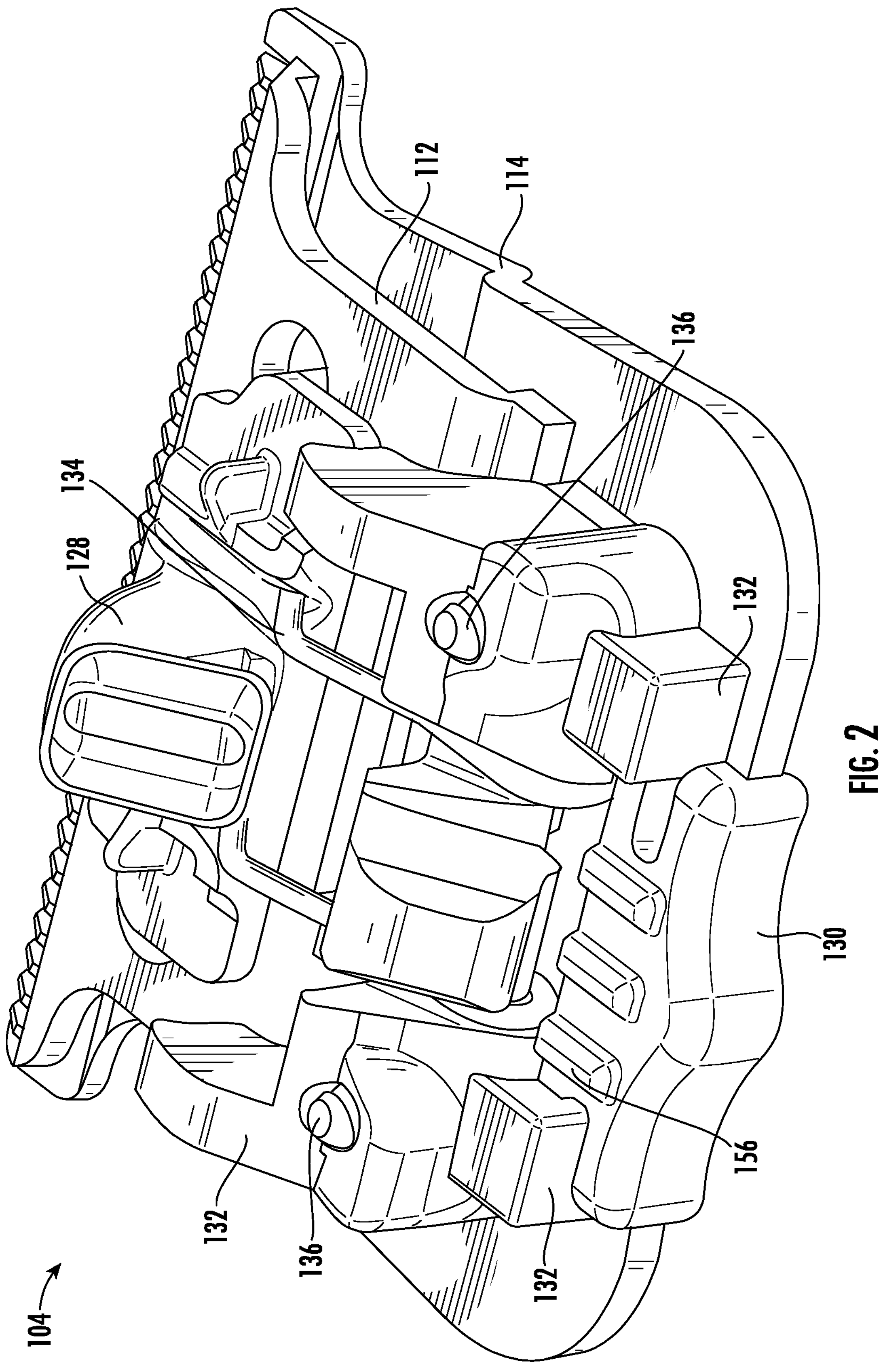
FIG. 2 is a top perspective view of an assembled blade assembly, according to an exemplary embodiment.

FIG. 2 illustrates a perspective view of blade assembly 104. Blade assembly 104 includes inner blade 112 and outer blade 114. In the illustrated embodiment, outer blade 114 does not oscillate and is fixed relative to body 102, such that inner blade 112 is configured to oscillate, reciprocate, or slide relative to outer blade 114 to facilitate cutting. Inner blade 112 oscillates over outer blade 114 to create a cutting blade assembly 104 capable of cutting hair.

Blade assembly 104 includes an adjustment gap assembly, mechanism, or slider 130 that translates inner blade 112 over outer blade 114 in a direction that is transverse to the oscillatory motion of inner blade 112. Translation of inner blade 112 in this transverse direction changes the cut-length during operation of cutter 100. Spring retainer 132 couples to inner blade 112 via a spring 134. Spring retainer 132 is fixedly attached to outer blade 114 (e.g., by fasteners 136). Spring 134 interconnects spring retainer 132 to yoke 128 and permits yoke 128 to oscillate from the rotational output of eccentric shaft 126.

Yoke 128 is coupled to inner blade 112 and to eccentric shaft 126, which is coupled to motor 120. Yoke 128 oscillates inner blade 112 over outer blade 114 based on the rotational output of motor 120 through eccentric shaft 126. In other words, spring retainer 132 fixedly couples to outer blade 114 and connects to yoke 128 via spring 134 to allow translation of yoke 128 relative to spring retainer 132. Yoke 128 is fixedly coupled to inner blade 112 and receives motor 120 output through eccentric shaft 126. The eccentric rotation of eccentric shaft 126 oscillates inner blade 112 over outer blade 114. With reference to FIGS. 1 and 2, as motor 120 rotates, motor output shaft 122 rotates eccentric drive 124 coupled to eccentric shaft 126. As eccentric shaft 126 rotates within yoke 128, inner blade 112 oscillates over outer blade 114. As illustrated in FIG. 2, a selector mechanism or adjustment slider 130 slidably couples along a rear edge of outer blade 114. Operating slider 130 changes the orientation of inner blade 112 with respect to outer blade 114 in a direction orthogonal to the oscillatory motion of inner blade 112. In various embodiments, slider 130 is powered manually or electronically (e.g., by a motor).

Figure 3:
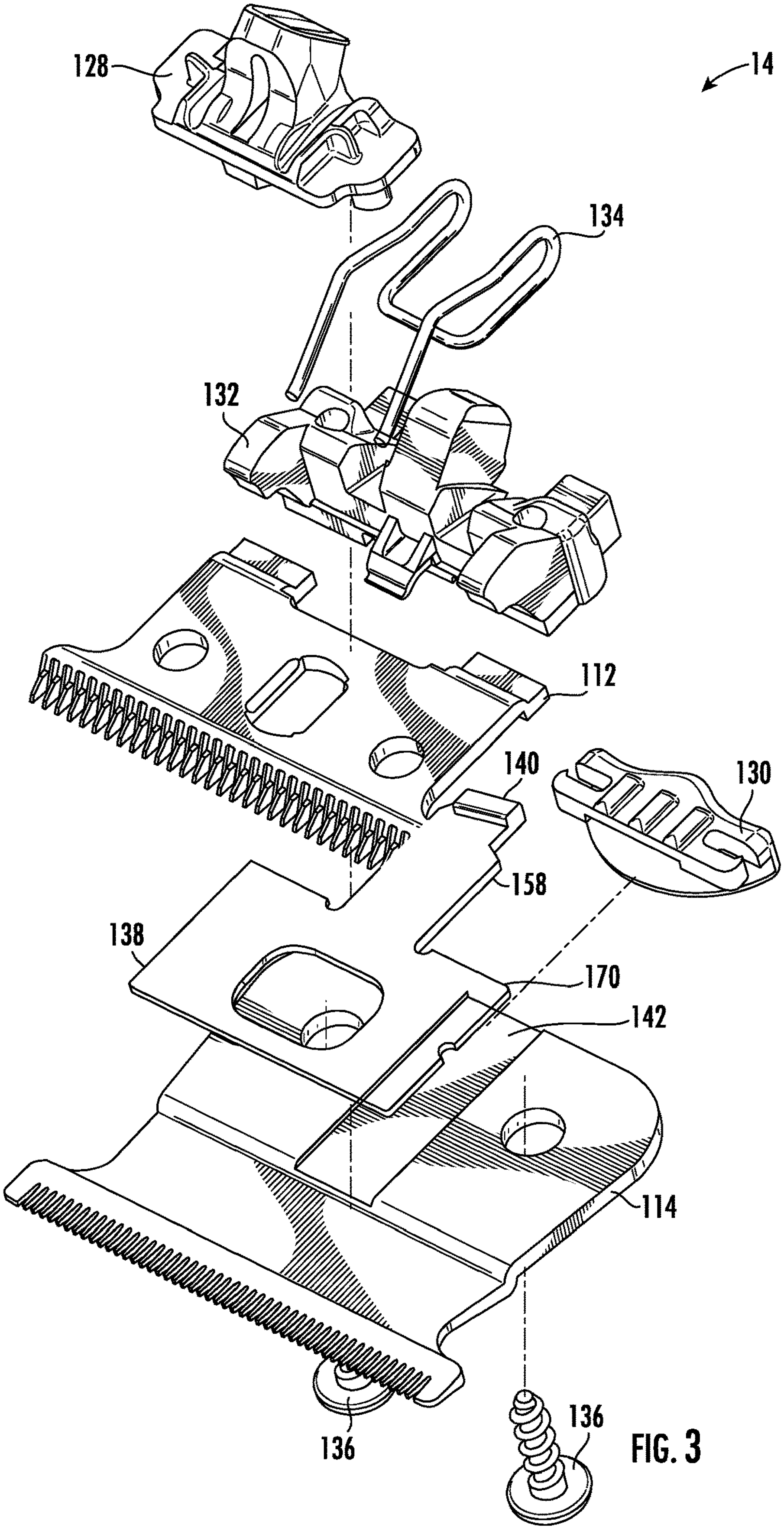
FIG. 3 is an exploded view of the blade assembly of FIG. 2.

FIG. 3 is an exploded view of the blade assembly 104 illustrated in FIG. 2. A blade guide assembly, guide member, or T-guide 138 interconnects inner blade 112 to slider 130. T-guide 138 maintains a relative position of inner blade edge 166 relative to outer blade edge 168. In other words, T-guide 138 is coupled to both inner blade 112 and slider 130. T-guide 138 converts translation of slider 130 along the rear edge of outer blade 114 to translation of inner blade 112 in a direction that is transverse to the oscillatory motion of inner blade 112. T-guide 138 includes an angled edge 140 that fits inside slider 130. Angled edge 140 is angled so that the motion of slider 130 along the outer rear edge of outer blade 114 causes T-guide 138 to push or pull inner blade 112 along the top surface of outer blade 114. In this way, T-guide 138 extends or retracts inner blade 112 relative to outer blade 114.

In some embodiments, outer blade 114 includes a track, slot, or recess 142 for T-guide 138. Recess 142 captures T-guide between inner blade 112 and outer blade 114 and directs T-guide 138 along recess 142 to translate inner blade 112 relative to outer blade 114 in a direction transverse to the sliding motion of slider 130 along the rear edge of outer blade 114.

One or more fasteners 136 fixedly couple outer blade 114 to spring retainer 132 and/or body 102 (FIG. 1). In the illustrated embodiment, two fasteners 136 on either side of outer blade 114 fixedly attach outer blade 114 to spring retainer 132 so that outer blade 114 does not oscillate and/or is stationary relative to the oscillatory and transverse translations of inner blade 112. In this configuration, outer blade 114 is said to be fixed, stationary, or non-moving. In some embodiments, inner blade 112 moves relative to outer blade 114, such that inner and/or outer blades 112 and 114 translate and/or oscillate. Inner blade 112 oscillates in one direction relative to outer blade 114 to facilitate cutting hair and translates in an orthogonal or transverse direction to change the cutting length of cutters 100 when an operator adjusts slider 130.

FIG. 3 shows spring retainer 132 in a top perspective view. This view illustrates the connection of spring 134 coupled to spring retainer 132 in an exemplary embodiment. Similarly spring 134 ends couple to yoke 128. Thus spring 134 biases yoke 128 to a neutral resting position as inner blade 112 oscillates in response to the output from motor 120.

Figure 4:
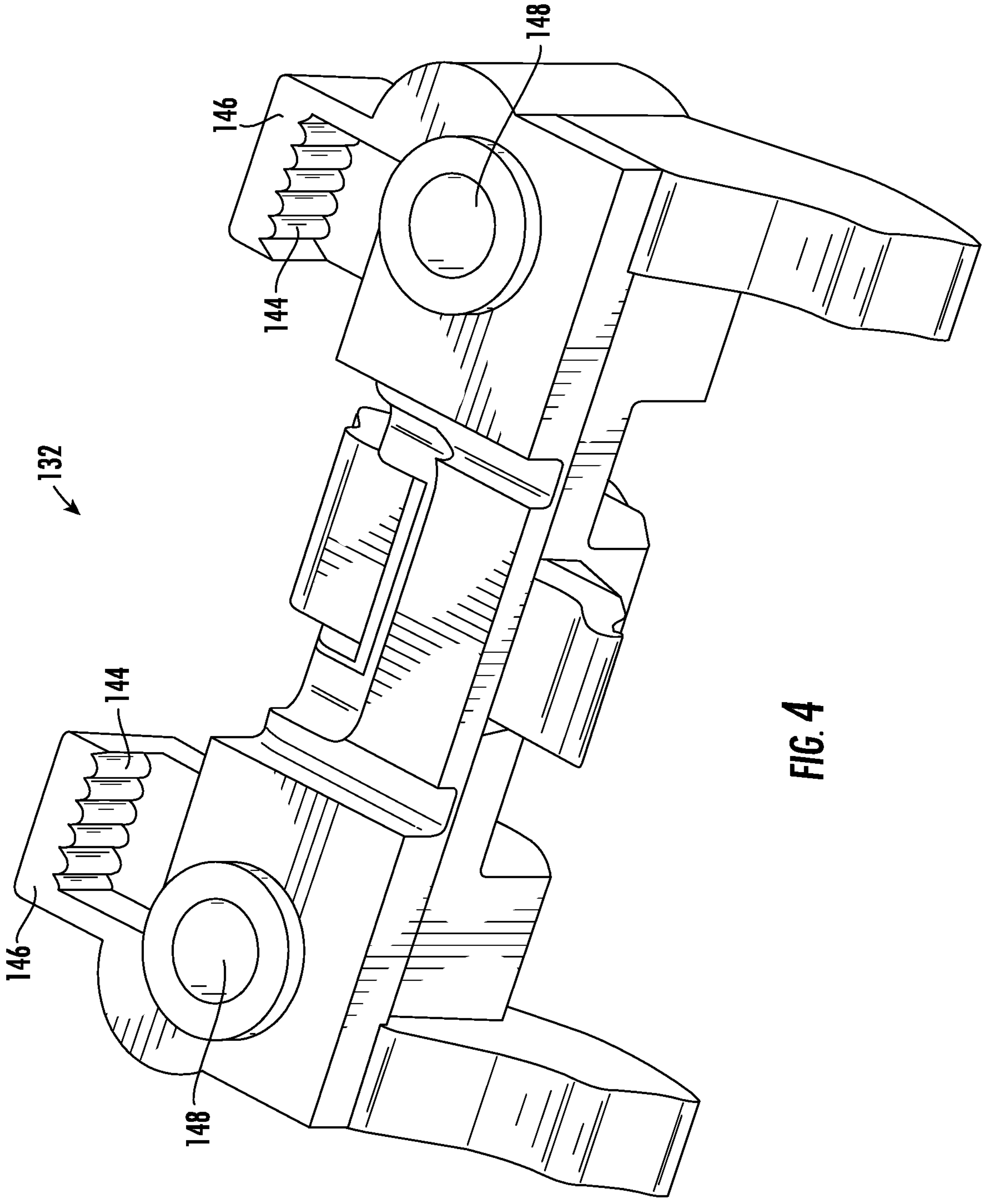
FIG. 4 is a bottom perspective view of the spring retainer of FIG. 2, opposite the top view shown in FIG. 3.

FIG. 4 is a bottom perspective of an underside of spring retainer 132, according to an exemplary embodiment. Spring retainer 132 includes a plurality of ridges 144 inside a pair of pockets 146 on the rear (e.g., opposite cutting end 116) of spring retainer 132. Pockets 146 receive both ends (e.g., either side) of slider 130. Ridges 144 slideably attach to slider 130 ends, such that slider 130 can slide or translate within pockets 146. Ridges 144 within pockets 146 releasably retain and/or lock slider 130 within the detents formed by ridge 144. In this way, ridges 144 enable translation and retention of slider 130 along the rear edge of outer blade 114. Thus, translation of slider 130 along the rear edge of outer blade 114 extends or retracts inner blade 112 to control the cutting length. Spring retainer 132 includes fastener holes 148 to receive fasteners 136 (FIG. 3) and fixedly couple spring retainer 132 to outer blade 114.

Figure 5:
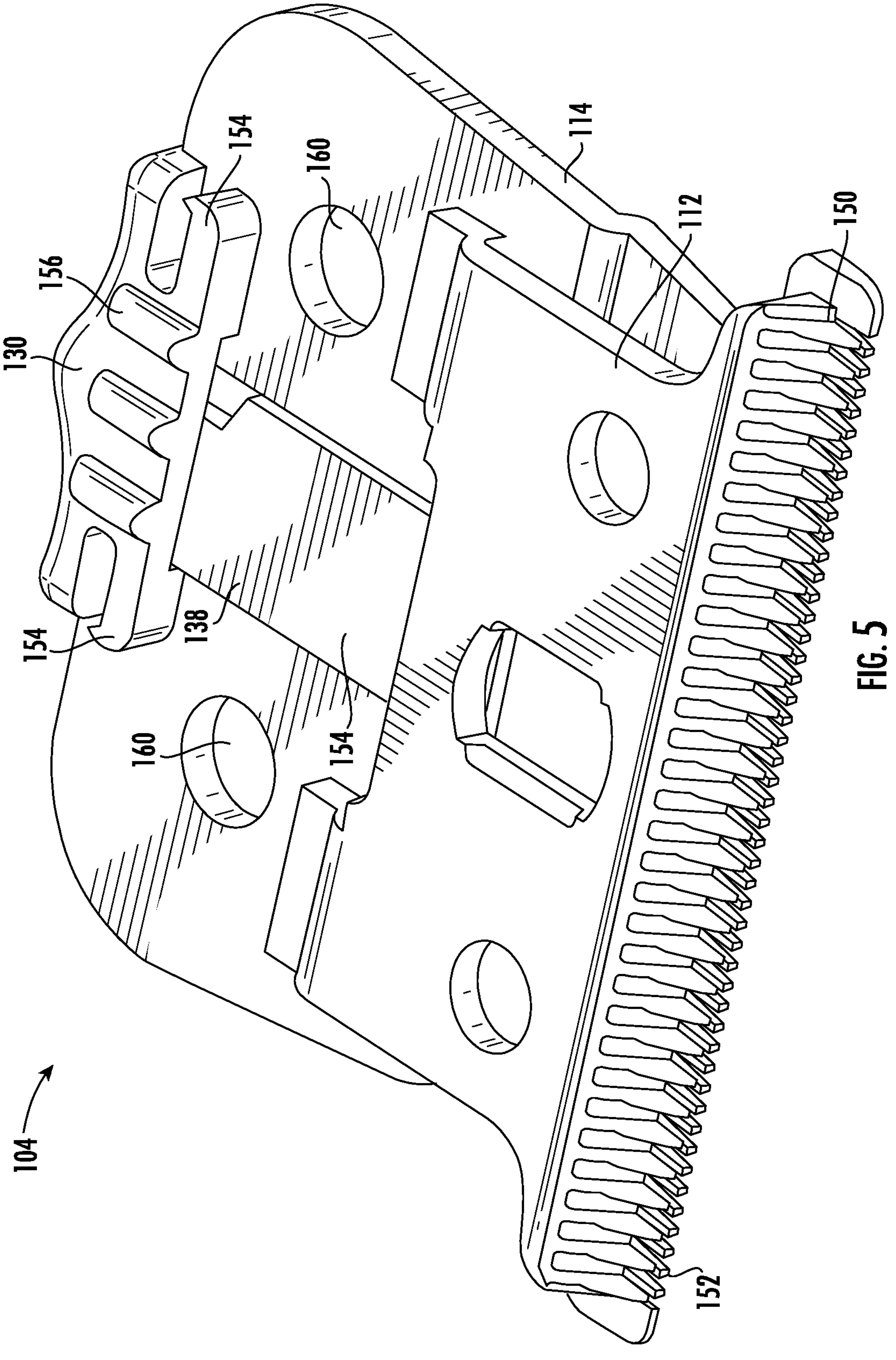
FIG. 5 is a blade assembly with several components removed to show the switch, T-blade, and inner and outer blades, according to an exemplary embodiment.

FIG. 5 is an isolated top perspective view of blade assembly 104, where structures of blade assembly 104 have been removed to clearly illustrate the interactions of inner blade 112, outer blade 114, slider 130, and T-guide 138. Inner blade 112 includes inner blade teeth 150. Outer blade 114 includes outer blade teeth 152. The shape of outer blade 114 may be convex so that translating inner blade 112 over the outer blade increases the cut-length of cutters 100. For example, inner and/or outer blade teeth 150 and/or 152 are thinner at a tip of the teeth 152 and thicker at a root or base of teeth 152.

Flanges 154 extend from either side of slider 130 and include a projection (detent) that fits within detents of ridges 144 (FIG. 4). As described above with reference to FIG. 3, flanges 154 slide within pockets 146 of spring retainer 132. Flanges 154 are retained by detents formed by ridges 144, temporarily retaining slider 130. In this way, the cut-length of cutters 100 is held constant during operation. Slider 130 further includes gripping formations 156. Gripping formations 156 may be disposed on a top, bottom, and/or side of slider 130 and facilitate clasping and sliding slider 130 along the rear edge of outer blade 114. T-guide 138 includes a base, extension body, or arm 158 that connects the sliding translation of a cross-portion or guide rail 170 (FIG. 3) to a ridge under inner blade 112. Guide rail 170 of T-guide 138 has a top side adjacent to inner blade 112 and a bottom side adjacent to outer blade 114. A pair of fastener holes 160 permit fasteners 136 to pass through outer blade 114 and fixedly couple outer blade 114 to spring retainer 132 and/or body 102.

Figure 6:
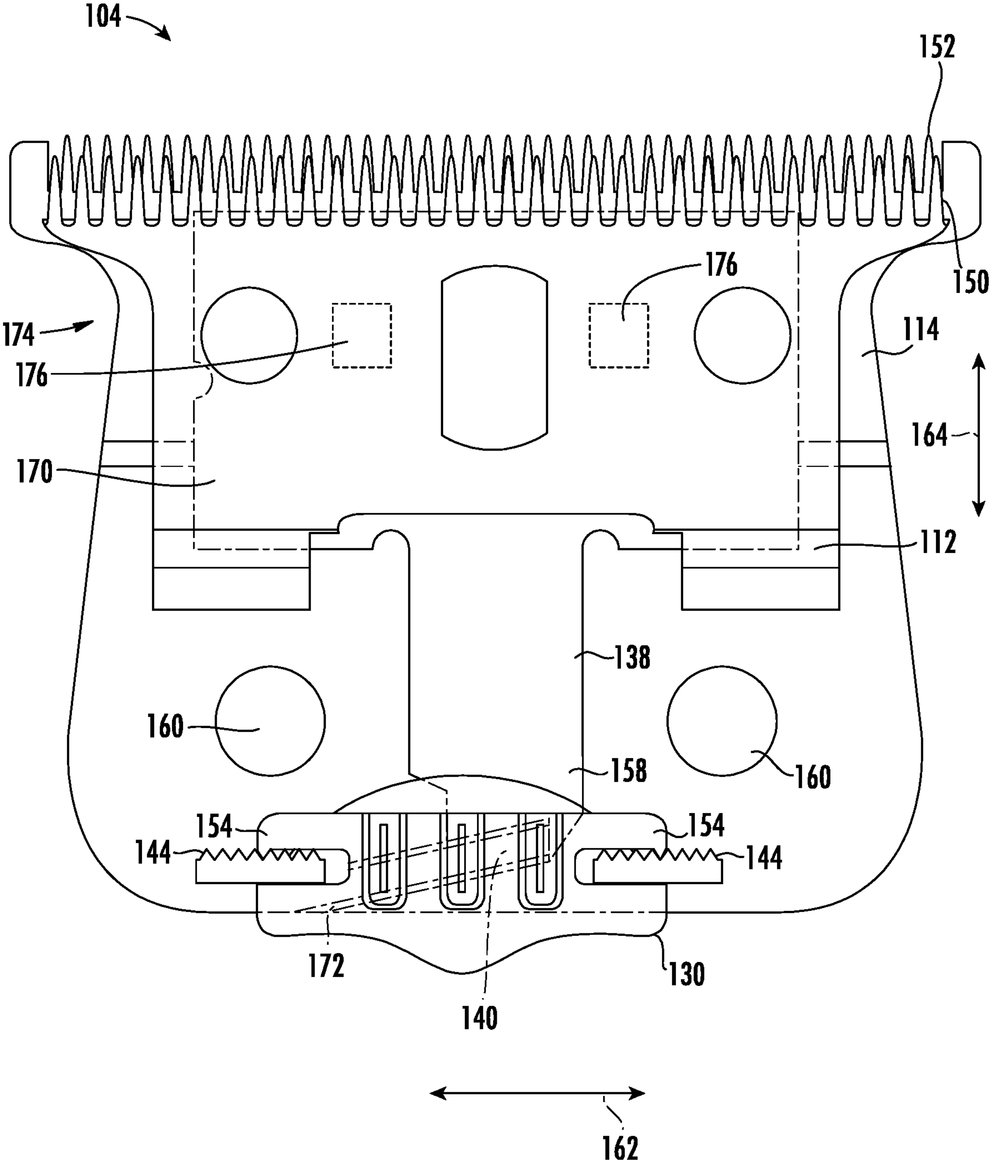
FIG. 6 is a top view of the blade assembly of FIG. 5 with the ridges of spring retainer shown in cross-section, according to an exemplary embodiment.

FIG. 6 is an isolated top view of the blade assembly 104 of FIG. 5. Inner blade 112 has inner blade teeth 150 that cooperatively oscillate over outer blade teeth 152 of outer blade 114 to cut hair. As shown in FIGS. 5 and 6, the tips of inner blade teeth 150 are recessed. That is, tips of inner blade teeth 150 are not aligned with tips of outer blade teeth 152. T-guide 138 is shown under inner blade 112 in ghost lines and couples to inner blade 112 under a ridge.

As slider 130 translates in a first or oscillatory direction 162 (e.g., left and right), inner blade 112 translates in a second or transverse direction 164 (e.g., forward and back). As shown, the translation along transverse direction 164 can be orthogonal to the oscillatory direction 162, but it may also include translations in other non-orthogonal directions. Elongated body or arm 158 ensures that translation of slider 130 in the oscillatory direction 162 translates inner blade 112 and inner blade edge 166 in the transverse direction 164 to increase or decrease a distance (or gap) to outer blade edge 168.

In some embodiments, a diagonal slot mechanism (e.g., arm 138 in slider 130) is coupled to the base or elongated arm 158 of T-guide 138, such that movement of slider 130 in a direction parallel to the inner and/or outer blade edges 166 and/or 168 moves the guide rail 170 in a direction perpendicular to inner and/or outer blade edges 166 and/or 168. In other words, slider 130 and channel 172 create a diagonal joint between arm 158 and guide rail 170.

Elongated arm 158 interconnects a cross-member or guide rail 170 (captured between inner and outer blades 112 and 114) of T-guide 138 to slider 130. Guide rail 170 is illustrated in FIG. 6 in ghost lines within slider 130. A channel 172 disposed within slider 130 that pushes or pulls on angled edge 140 as slider 130 slides along the rear of outer blade 114. Because channel 172 is located within slider 130, channel 172 is also illustrated in ghost lines. Angled edge 140 and channel 172 are slidably coupled, such that when slider 130 translates in a first or oscillatory direction 162, channel 172 pushes or pulls on angled edge 172 within slider 130. Moving slider 130 in the oscillatory direction 162 extends or retracts the guide rail 170 of T-guide 138, which is coupled to inner blade 112, in a second or transverse direction 164. This extends or retracts inner blade 112 in the transverse direction 164 and controls the cut length of cutters 100.

In some embodiments, guide rail 170 includes a magnetic tension assembly 174. For example, guide rail 170 is a ferromagnetic material that is magnetized. In other embodiments, guide rail 170 includes one or more magnets 176 and/or another electromagnetic device (e.g., windings). The magnetic tension assembly 174 and/or magnets 176 generate an attractive (e.g., tensile) force between the blade guide assembly or T-guide 138 and inner 112 and/or outer 114 blades. In some embodiments, the force is repulsive. In some embodiments, the magnetic tensile force between guide rail 170, inner and/or outer blades 112 and/or 114 is adjustable.

In some embodiments, inner blade 112, outer blade 114, yoke 128, and/or T-guide 138 are magnetized to create an attractive or repulsive force between inner blade 112 and outer blade 114. In some embodiments, the magnetic assembly is located on at least one of a yoke 128, the inner blade 112, the outer blade 114, or the T-guide 138. In other words, inner blade 112, outer blade 114, yoke 128, T-guide 138, and/or any combination thereof, creates a magnetic field to adjust or control a tensile force (attractive or repulsive) between inner and outer blades 112 and 114. For example, a magnetized yoke 128 is a non-conductive magnet carrier (e.g., a plastic yoke 128 carrying a ferrous magnet 176) or conductive magnetic material. In some embodiments, a compounding force is generated from a plurality of magnets 176 with relatively weaker magnetic forces to create a compounded magnetic force from the plurality of magnets 176. A variety of magnets may be used and may reduce the total cost of the magnetic assembly. In addition, using a magnetic force to control the force between blades 112 and 114 creates a reliable and efficient method to control the tensile force generated to maintain the friction between blades 112 and 114 while cutting hair.

FIG. 6 shows ridges 144 in cross-section with the remainder of spring retainer 132 removed. This view illustrates the interaction between flanges 154 on slider 130 with the ridges 144 of spring retainer 132. Flanges 154 releasably lock within detents formed on ridges 144 to prevent unwanted movement of slider 130 during operation. However, the interaction of flanges 154 and ridges 144 is released when an operator slides slider 130.

Figure 7:
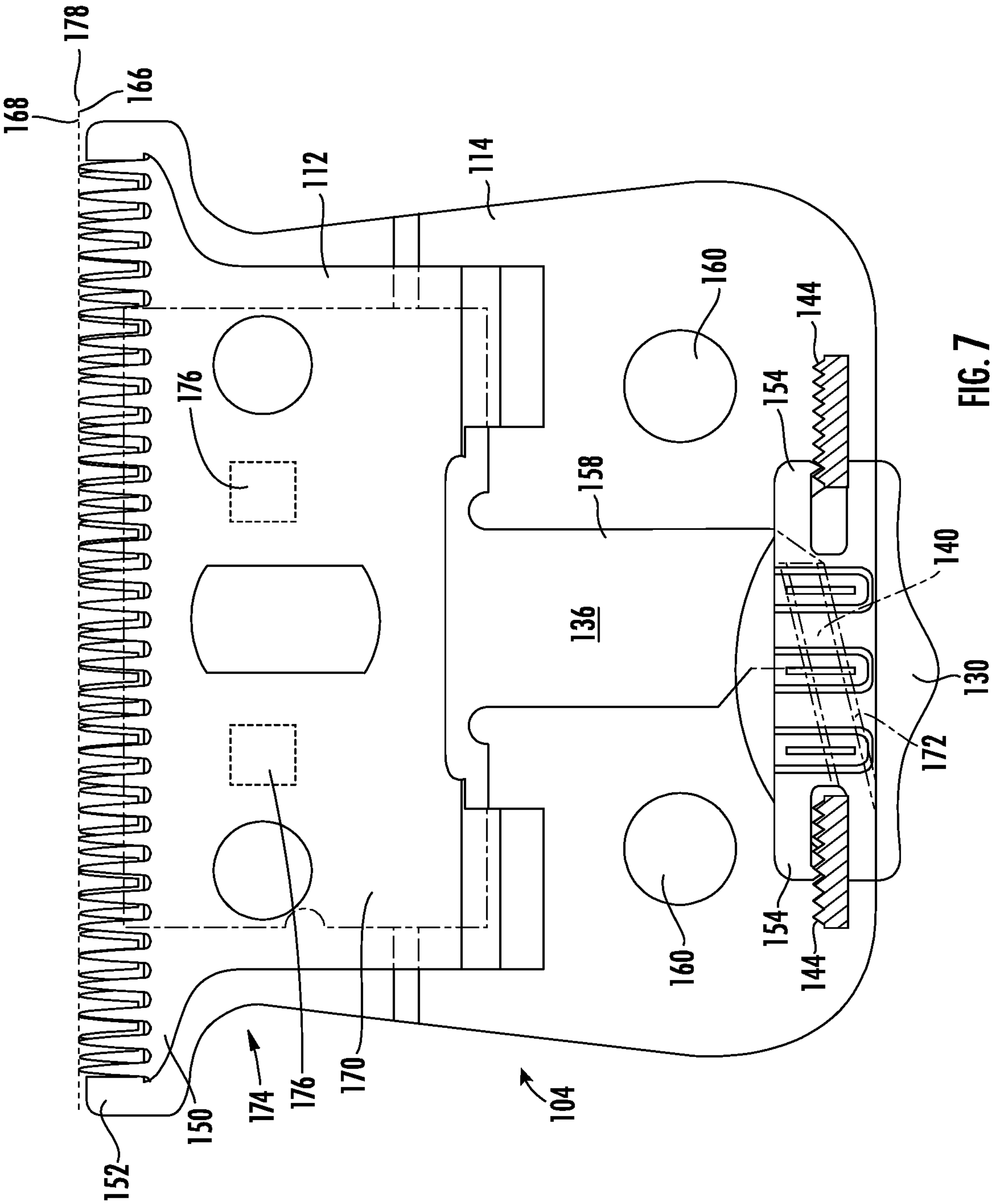
FIG. 7 is a top view of the blade assembly of FIG. 5 in a first aligned position where the inner blade and outer blade are aligned, according to an exemplary embodiment.
Figure 8:
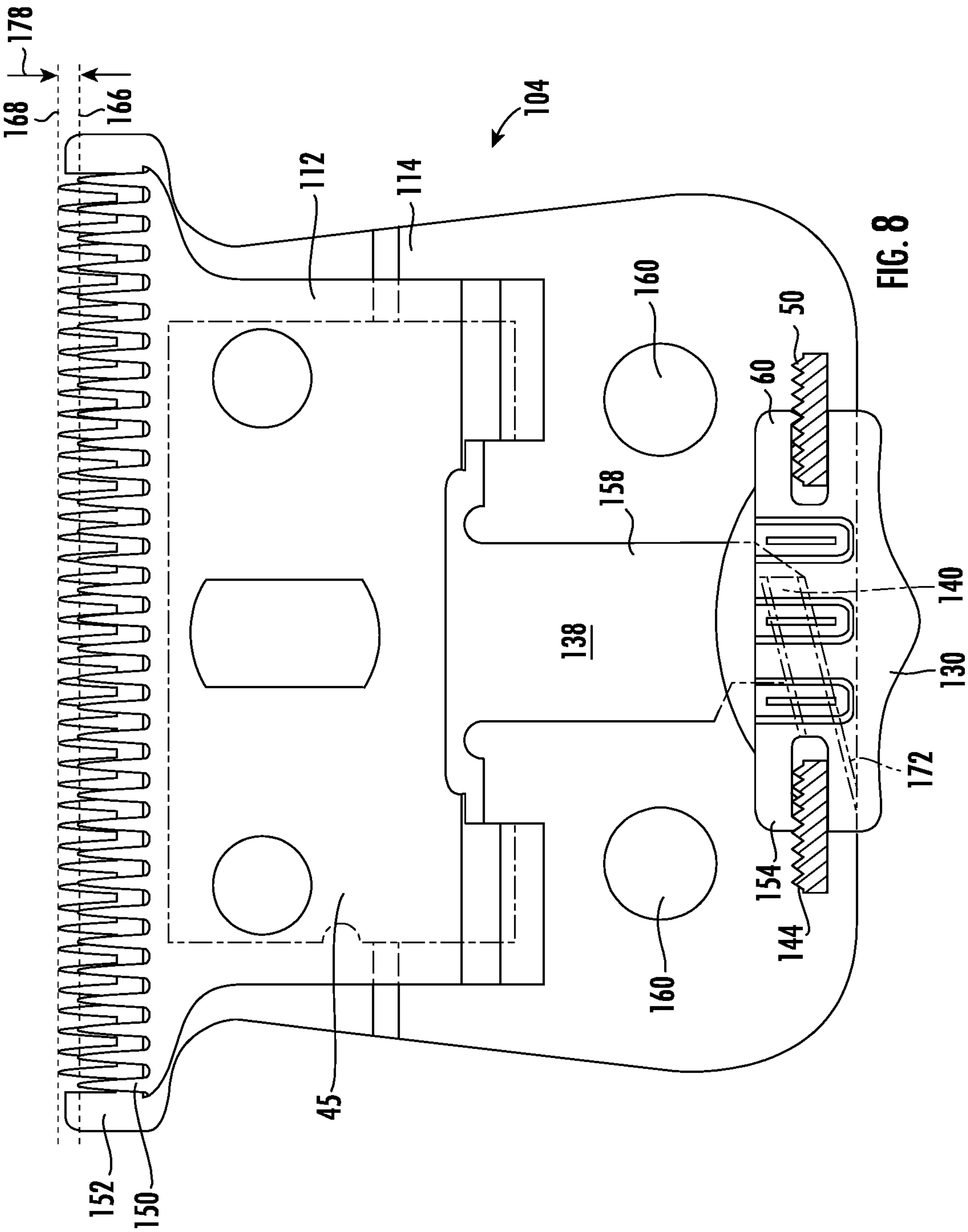
FIG. 8 is a top view of the blade assembly of FIG. 5 in a middle position where the inner blade is partially extended and partially retracted along the outer blade, according to an exemplary embodiment.
Figure 9:
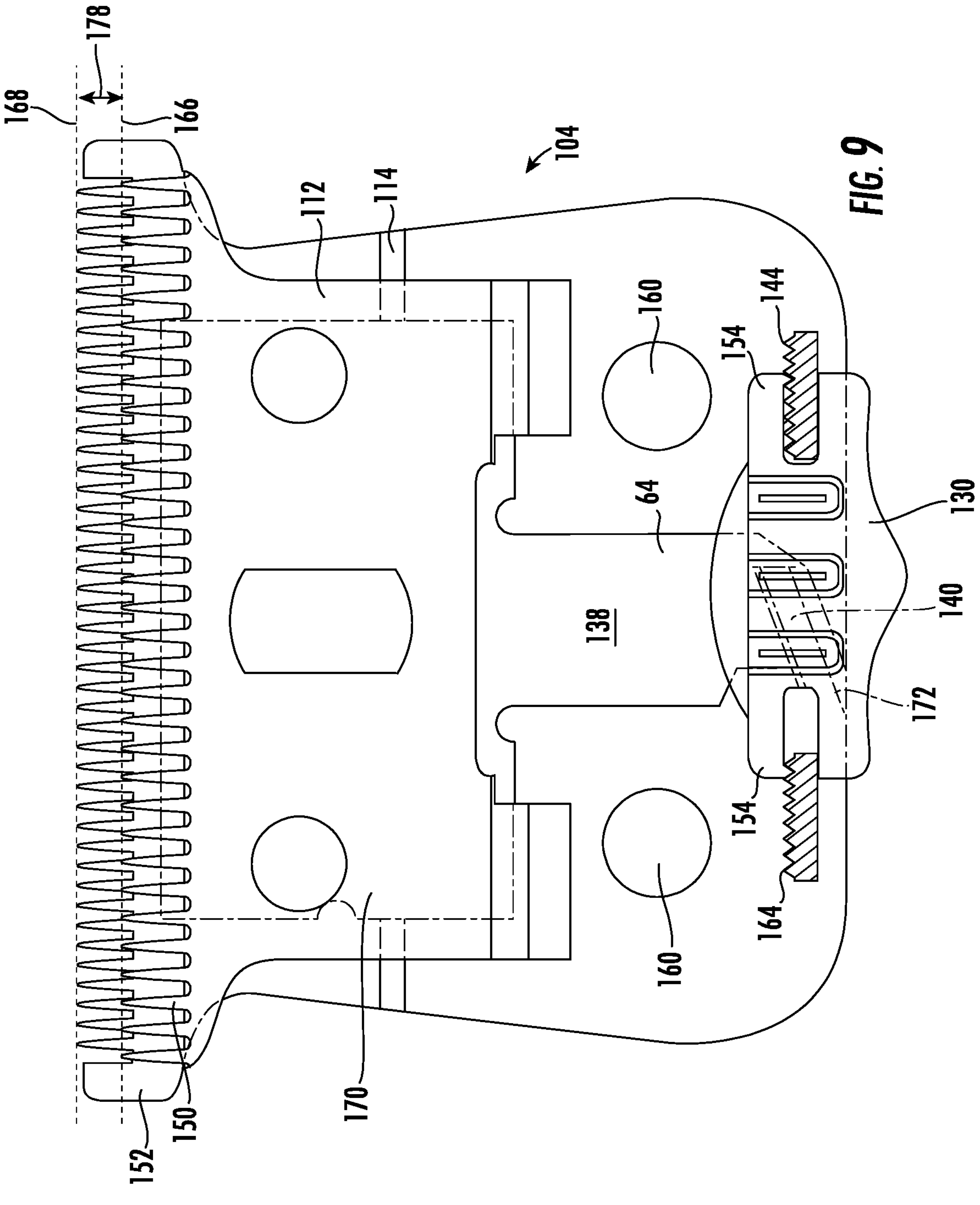
FIG. 9 is a top view of the blade assembly of FIG. 5 in a retracted position where the inner blade is fully retracted relative to the outer blade, according to an exemplary embodiment.

FIGS. 7-9 illustrate inner blade 112 and outer blade 114 in various configurations that illustrate how slider 130 moves inner blade 112 relative to outer blade 114. Inner blade 112 includes a plurality of inner blade teeth 150. Inner blade teeth 150 extend along an inner blade edge 166. The inner blade edge 166 is defined by an imaginary line connecting the tips of inner blade teeth 150. Similarly, an outer blade edge 168 is defined by an imaginary line connecting the tips of outer blade teeth 152. Inner blade 112 is positioned on top (or sits on top) of outer blade 114, with inner blade edge 166 being parallel to and, in some embodiments, offset from outer blade edge 168. In operation inner and outer blade edges 166 and 168 oscillate relative to each other. The distance between the imaginary line formed along inner blade edge 166 and the imaginary line formed along outer blade edge 168 is defined as a blade gap 178.

Movement of slider 130 translates inner blade 112 relative to outer blade 114, which changes the placement of eccentric shaft 126 within yoke 128. Yoke 128 is configured to receive eccentric shaft 126 on drive assembly 106 to oscillate inner blade 112 at any blade gap 178. As illustrated in FIGS. 7-9, three positions or configurations of inner blade 112 relative to outer blade 114 are shown, specifically "fine," "medium," and "deep" configurations. For example, three configurations that represent a fine gap, a medium gap that is greater than the fine gap, and a long gap that is greater than either the fine gap or the medium gap between inner blade edge 166 relative to outer blade edge 168. Additional preset configurations may generate more intermediate gaps and/or cut lengths. Slider 130 may adjust between two or more predetermined blade gap 178 between inner and outer blade edges 166 and 168. For example, slider 130 may include 2, 3, 4, 5, 6, 7, 8, 9, 10, 11, 12, 13, 14, 15, 16, 17, 18, 19, 20, or more gradations or predetermined configurations.

Slider 130 may include words or inscriptions (e.g., "deep" and "fine") and tactile and/or visual indicators to indicate which configuration of slider 130 results in a longer "deep" or shorter "fine" cut. For example, a single bump on one side (e.g., "fine") and two or more bumps (e.g., "deep") on an opposite side of slider 130 provides both visual and tactile indication of blade gap 178 in either configuration. Similarly, short lines on one side and long lines on an opposite side of slider 130 provide visual and/or tactile indication of a cut length in the slider 130 position.

FIG. 7 illustrates a first fully extracted inner blade 112 with slider 130 in a "fine" cut configuration. This position is referred to as the aligned position because inner blade edge 166 and outer blade edge 168 are collinear. In this configuration, inner blade 112 is aligned with outer blade 114, such that inner blade edge 166 of inner blade teeth 150 is aligned with outer blade edge 168 of outer blade teeth 152. Because of this alignment no blade gap 178, or a relatively small blade gap 178, exists between inner blade edge 166 and outer blade edge 168.

As shown, slider 130 is not centered on outer blade 114, but is located nearer to a first fastener hole 160 (on the left) than to a second fastener hole 160 (on the right). In other words, slider 130 is located on a first side (e.g., left of center) along the edge of outer blade 114 and extends T-guide 138 a maximum distance. This outer blade edge 168 configuration places outer blade edge 168 near inner blade edge 166 to create a small or non-existent blade gap 178. The result is that inner blade edge 166 fully extends and/or aligns with outer blade edge 168 and produces a short or "fine" cutting length.

As shown in FIG. 7, the left flange 154 is further extended along ridge 144 than the opposite right flange 154 relative to ridge 144. Stated differently, the left ridge 144 is almost entirely within the left flange 154 and the right ridge 144 is almost fully extended within the right flange 154 of slider 130. In this configuration, channel 172 is pushing guide rail 170 a maximum distance resulting in a full extension of inner blade teeth 150 and/or edge 166.

FIG. 8 shows a second or centered position of inner blade 112 relative to outer blade 114. In this configuration, slider 130 is centered on either side of ridges 144 such that flanges 154 extend an equal distance over the ridges 144 on either side. Flange 154 extends an equal distance over ridges 144 on both sides of slider 130. This configuration centers channel 172 so that T-guide 138 and guide rail 170 are centered and arm 158 is centered within slider 130. Inner-blade edge 166 is in a mid-location, being neither fully extended nor fully retracted. Inner-blade edge 166 of inner blade 112 is midway between full extraction and full retraction above outer blade edge 168 of outer blade 114, forming a medium sized blade gap 178. This configuration results in a medium or "mid-length" cut.

FIG. 9 shows a fully retracted inner blade 112. Slider 130 is fully extended to the right. Slider 130 is closer to the second fastener hole 160 on the right than it is to the first fastener hole 160 on the left, providing a visual indication to an operator of the longer cut. The right ridge 144 is almost entirely within the right flange 154 and the left ridge 144 is almost entirely extended within the left flange 154. In this configuration, inner blade 112 is fully retracted along outer blade 114, such that inner blade edge 166 is maximally displaced from outer blade edge 168. This configuration pulls or displaces angled edge 140 a maximum distance away from outer blade edge 168 and maximizes the blade gap 178 length. Therefore, the cut hair length of cutters 100 is maximized, producing a long or "deep" cutting length.

Figure 10:
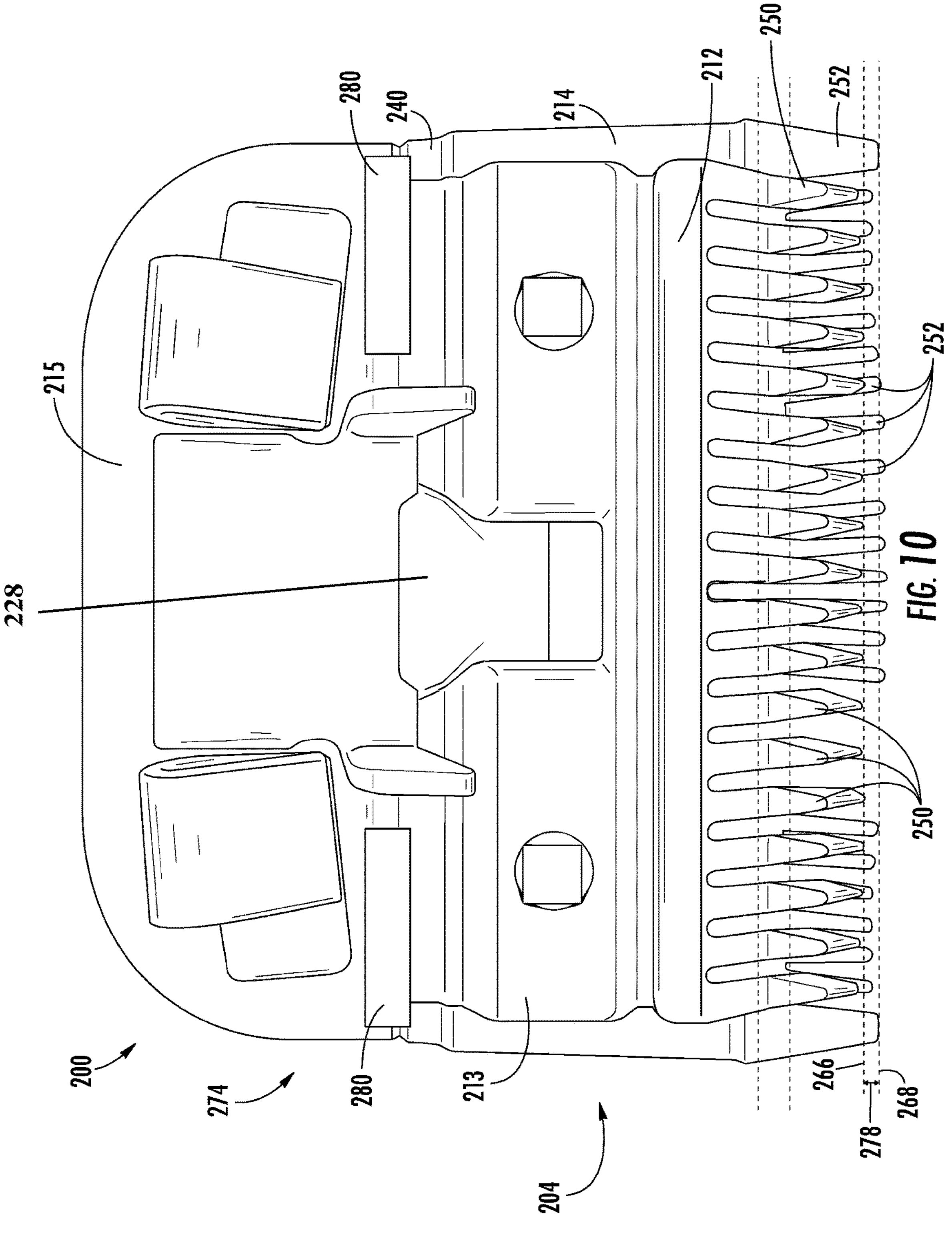
FIG. 10 is a plan view of one embodiment of the blade assembly having magnetic tensioning.
Figure 11:
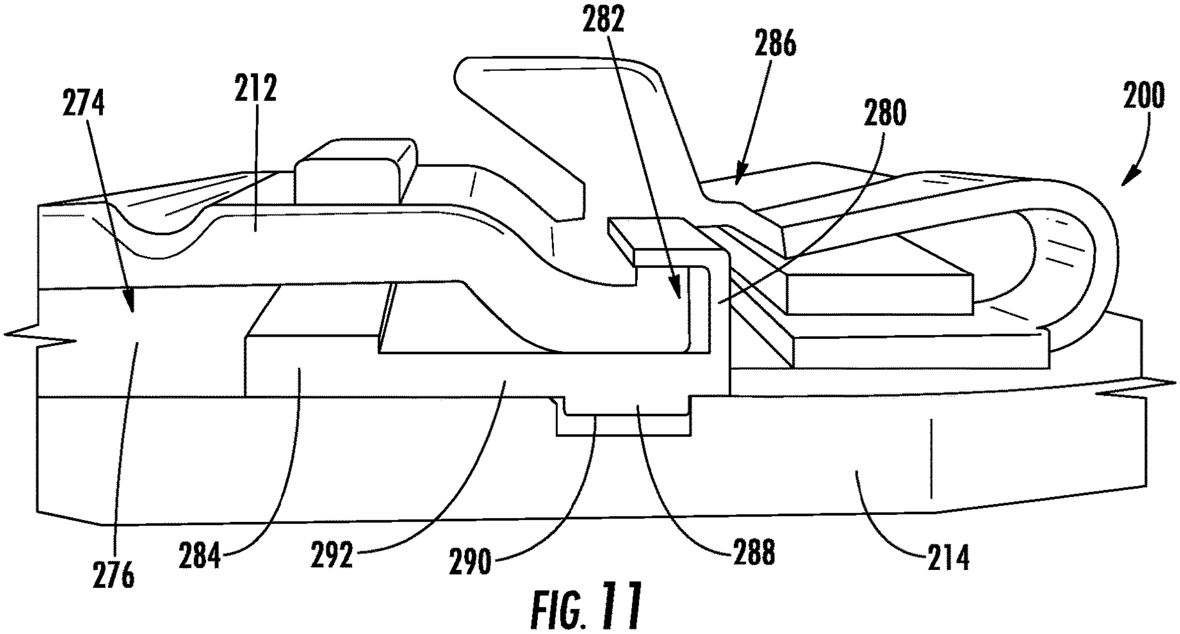
FIG. 11 is a first side view of the blade assembly of FIG. 10.
Figure 12:
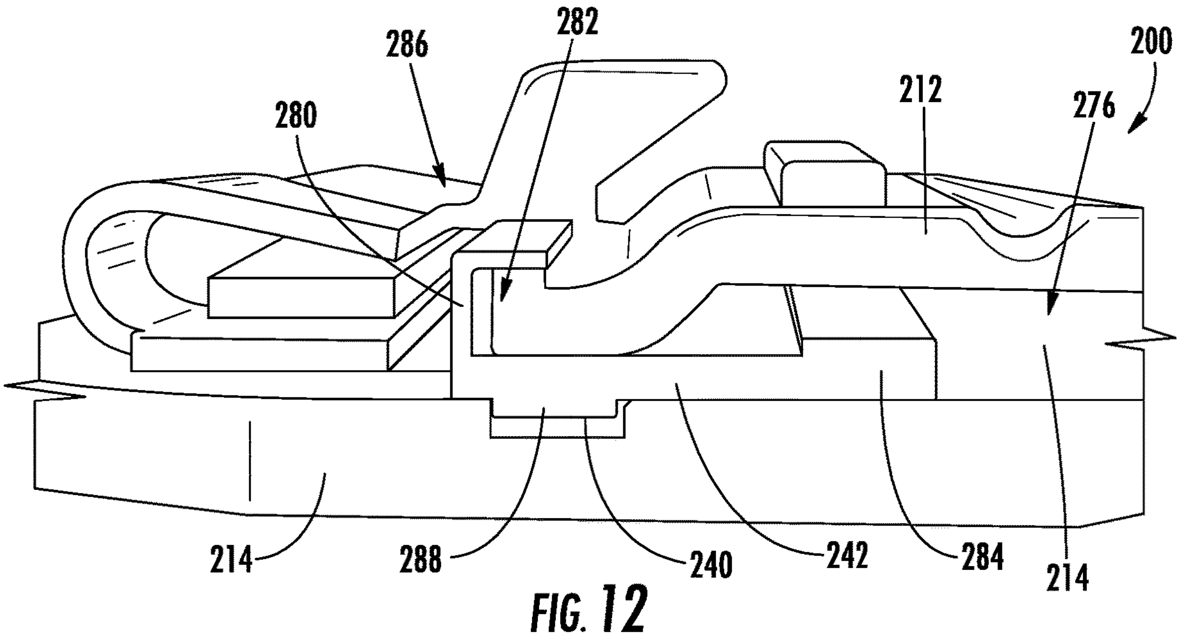
FIG. 12 is a second side view of the blade assembly of FIG. 10, opposite the side shown in FIG. 11.

FIGS. 10-13 illustrate another embodiment of a cutter 200 with a blade assembly 204. Blade assembly 204 includes an inner blade 212 with upper body 213 and outer blade 214 with lower body 215. The embodiment of cutter 200 is substantially the same or similar to the embodiment of cutters 100 illustrated in FIGS. 1-9, except for the differences described. In contrast the embodiment of cutters 100, the embodiment of cutters 200 includes a U-shaped portion 280 that defines a guide channel 282 and a guide body 284 (FIGS. 11-12). Similar components of cutter 200 are assigned the same reference number as cutter 100 beginning with 200.

FIG. 10 shows inner blade 212, inner body 213, and a plurality of inner blade teeth 250. Inner blade teeth 250 extend along an inner blade edge 266. Inner blade edge 266 is defined by an imaginary line connecting the tips of inner blade teeth 250. Lower blade 214 includes body 215 and a plurality of outer blade teeth 252. Outer blade teeth 252 extend along an outer blade edge 268. Outer blade edge 268 is defined by an imaginary line connecting the tips of outer blade teeth 252. In some embodiments, inner blade edge 266 and outer blade edge 268 are defined as a line connecting the roots (rather than the tips) of teeth 250 and/or 252. Upper blade 212 is positioned on top (or sits on top) of outer blade 214, with inner blade edge 266 being parallel to and offset from outer blade edge 268 by a blade gap 278. The distance between inner blade edge 266 and outer blade edge 268 is defined as blade gap 278.

In some embodiments, inner blade 212, outer blade 214, yoke 228, and/or blade guide assembly 286 are magnetized to create an attractive or repulsive force between inner blade 212 and outer blade 214. For example, a magnetic assembly is located on at least one of the yoke 228, inner blade 212, or outer blade 214. In other words, inner blade 212, outer blade 214, the yoke 228, and/or any combination thereof, creates a magnetic field to adjust or control a tensile force (attractive or repulsive) between inner and outer blades 212 and 214. For example, a magnetized yoke 228 is a non-conductive magnet carrier (e.g., a plastic yoke 228 carrying a ferrous magnet 276) or conductive magnetic material. In some embodiments, a compounding force is generated from a plurality of magnets 276 with relatively weaker magnetic forces to create a compounded magnetic force from the plurality of magnets 276. A variety of magnets may be used and may reduce the total cost of the magnetic assembly. In addition, using a magnetic force to control the force between blades 212 and 214 creates a reliable and efficient method to control the tensile force generated to maintain the friction between blades 212 and 214 while cutting hair.

Figure 13:
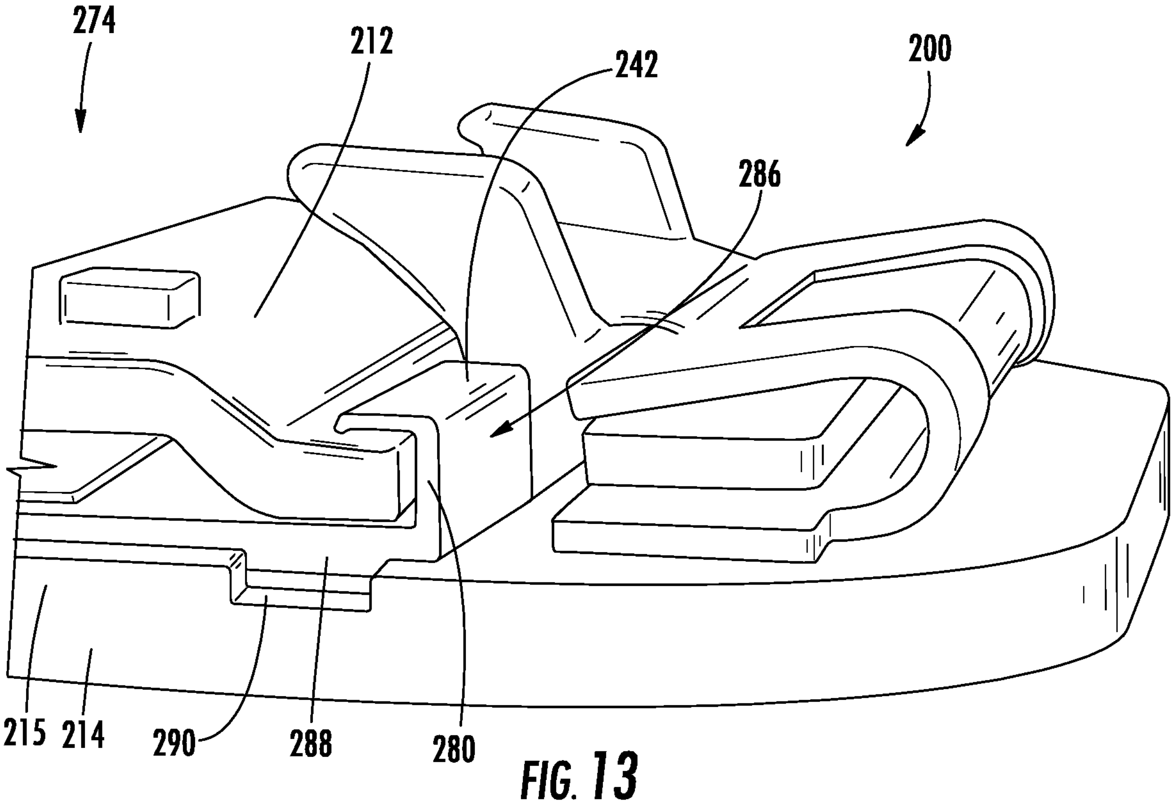
FIG. 13 is a perspective view of a back and the first side of the blade assembly of FIG. 10.

Referring to FIGS. 11-13, a blade guide assembly 286 includes a blade guide 288 and a projection 292 that is received by a slot 290 within outer blade 214. Blade guide assembly 286 maintains a relative position of the inner blade edge 266 relative to outer blade edge 268. Slot 290 is positioned in body 215 and extends parallel to outer blade edge 268. In other embodiments, slot 290 is oriented in any suitable direction relative to outer blade edge 268. Blade guide 288 is also coupled to outer blade 214. For example, blade guide 288 is fastened by a friction fit (e.g., projection 292 is frictionally received by slot 290, etc.), an adhesive, and/or any suitable fastener (e.g., a screw, etc.). Receiving projection 292 orients blade guide 288 relative to outer blade 214 and facilitates guidance of inner blade 212.

Referring to FIGS. 11-12, U-shaped portion 280 defines guide channel 282 and guide body 284. Guide channel 282 receives an end of inner blade 212 that is opposite inner blade edge 266 (e.g., a back end or edge of inner blade 212). Guide channel 282 is oriented parallel to inner blade edge 266 to facilitate reciprocating (or lateral) guidance of inner blade 212 relative to outer blade 214 during oscillation. Guide body 284 extends away from guide channel 282, and is positioned between inner and outer blades 212 and 214. Guide body 284 has a top side adjacent to inner blade 212 and a bottom side adjacent to outer blade 214.

In some embodiments, blade assembly 204 includes a magnetic tension assembly 274. Magnetic tension assembly 274 uses electromagnetic forces to apply an attractive or tension force between inner blade 212 and outer blade 214, for example, blade assembly 204 and inner and/or outer blades 212 and/or 214. In some embodiments, magnetic tension assembly 274 replaces traditional spring based systems that apply a tension force between blades 212 and 214. The attractive tensile force maintains inner blade 212 position (up and down) relative to outer blade 214 during oscillatory reciprocation (e.g., cutting hair).

As will be described in detail below, in some embodiments, the magnetic tensile force between inner and/or outer blades 212 and/or 214 is adjustable. In some embodiments, the magnetic polarities are reversed, such that the magnetic force repels the inner and outer blades 212 and 214 (e.g., generates a repulsive force on blades 212 and 214).

Magnetic tension assembly 274 includes a magnetized ferromagnetic material and/or at least one magnet 276 positioned between inner and outer blades 212 and 214. The illustrated bar magnet 276 is sandwiched between inner and outer blades 212 and 214. In other embodiments, magnet 276, includes any suitable electromagnetic force (e.g., a permanent magnet, a polymagnet, electric coil, etc.) or shape (e.g., circular, oblong, or a magnetized cross-member or guide rail 270). In some embodiments, magnet 276 includes a plurality of magnets positioned between inner and outer blades 212 and 214. Magnet 276 is fastened (or otherwise coupled) to outer blade 214. For example, magnet 276 is fastened by an adhesive, a fastener (e.g., a screw, etc.), or any other suitable fastening device. Magnet 276 then applies an attractive magnetic or tensile force on inner blade 212 during oscillation. Stated another way, inner blade 212 is drawn towards outer blade 214 by magnet 276. The attractive tensile force applied by magnet 276 is such that inner blade 212 is able to reciprocate relative to outer blade 214 while maintaining the position of inner blade edge 266 relative to outer blade edge 268. Magnet 276 is captured between the blades 212 and 214 to apply a magnetic attractive (e.g., tensile) force on inner blade 212, which provides improved tension control of inner blade 212 during reciprocation.

In operation, motor 220 drives reciprocation of inner blade 212 relative to outer blade 214 through a drive assembly 206 and/or a transmission (not shown). During reciprocation of inner blade 212, blade guide assembly 286 guides reciprocal movement of inner blade 212 relative to outer blade 214 to maintain a consistent blade gap 186. In addition, magnetic tension assembly 274 applies a magnetic tensile force on inner blade 212 to maintain the position of inner blade edge 266 relative to outer blade edge 268 to reduce friction and facilitate an even cut.

FIGS. 14-17 illustrate another embodiment of a cutter 300 with a blade assembly 304. Blade assembly 304 includes an inner blade 312 with upper body 313 and outer blade 314 with lower body 315. The embodiment of cutter 300 is substantially the same or similar to the embodiment of cutters 100 and 200, except for the differences described. In contrast the embodiment of cutters 100 and 200, the embodiment of 300 includes an alternative fastener 336 for blade guide assembly 306 to outer blade 314. In addition, blade assembly 304 of cutter 300 includes an alternative embodiment of a magnetic tension assembly 374. Similar components of cutter 300 are assigned the same reference number of cutters 100 and 200 beginning with 300.

In some embodiments, inner blade 312, outer blade 314, and/or blade guide assembly 386 are magnetized to create an attractive or repulsive force between inner blade 312 and outer blade 314. For example, a magnetic assembly is located on at least one of inner blade 312 or outer blade 314. In other words, inner blade 312, outer blade 314, blade guide assembly 386, and/or any combination thereof, creates a magnetic field to adjust or control a tensile force (attractive or repulsive) between inner and outer blades 312 and 314. In some embodiments, a compounding force is generated from a plurality of magnets 376 with relatively weaker magnetic forces to create a compounded magnetic force from the plurality of magnets 376. A variety of magnets may be used and may reduce the total cost of the magnetic assembly. In addition, using a magnetic force to control the force between blades 312 and 314 creates a reliable and efficient method to control the tensile force generated to maintain the friction between blades 312 and 314 while cutting hair.

Figure 15:
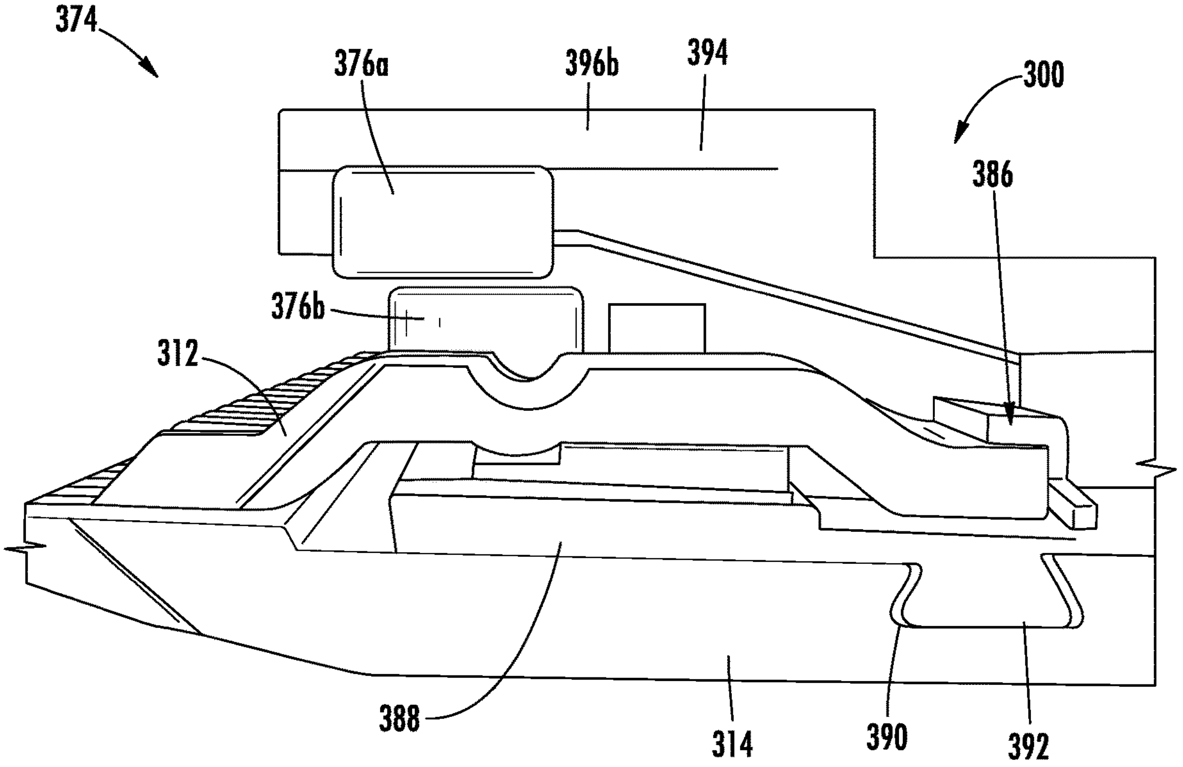
FIG. 15 is a first side view of the blade assembly of FIG. 14, illustrating a portion of the magnetic tensioning assembly.
Figure 16:
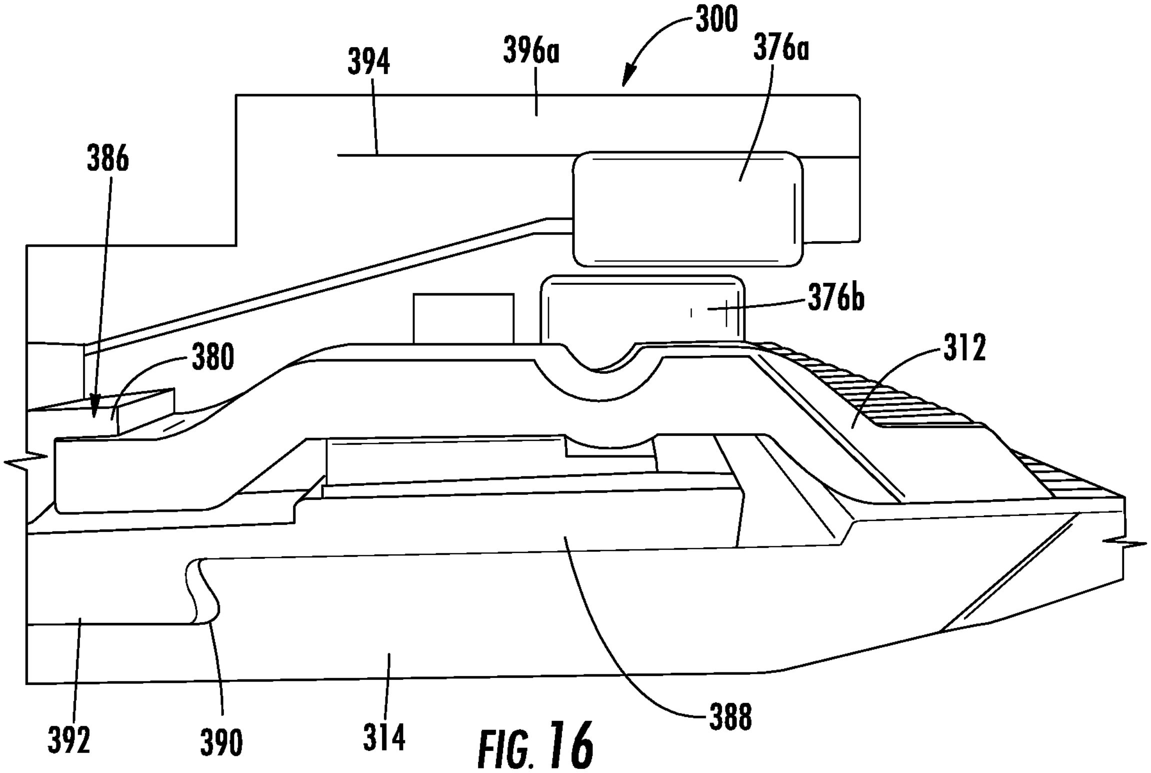
FIG. 16 is a second side view of the blade assembly of FIG. 14, opposite the side shown in FIG. 15.

FIGS. 15-16 illustrate projection 392 of blade guide 388 with a geometry that is configured to be received by a complimentary geometry of slot 390 in outer blade 314 of body 315. Specifically, projection 392 defines a trapezoidal cross-sectional shape that is received by a trapezoidal slot 390. This allows projection 392 to be captured and slidably received by slot 390, while also fastening (and otherwise retaining) the blade guide assembly 386 to outer blade 314. Blade guide assembly 386 maintains a relative position of the inner blade edge 366 relative to outer blade edge 368. Effectively projection 392 and slot 390 together form a dovetail joint (or a dovetail) to provide resistance to separation. Projection 392 can have any suitable cross-sectional shape (e.g., geometric, triangular, etc.) that is received by a complimentary cross-sectional shape defined by slot 390 to fasten blade guide assembly 386 to outer blade 314.

Figure 14:
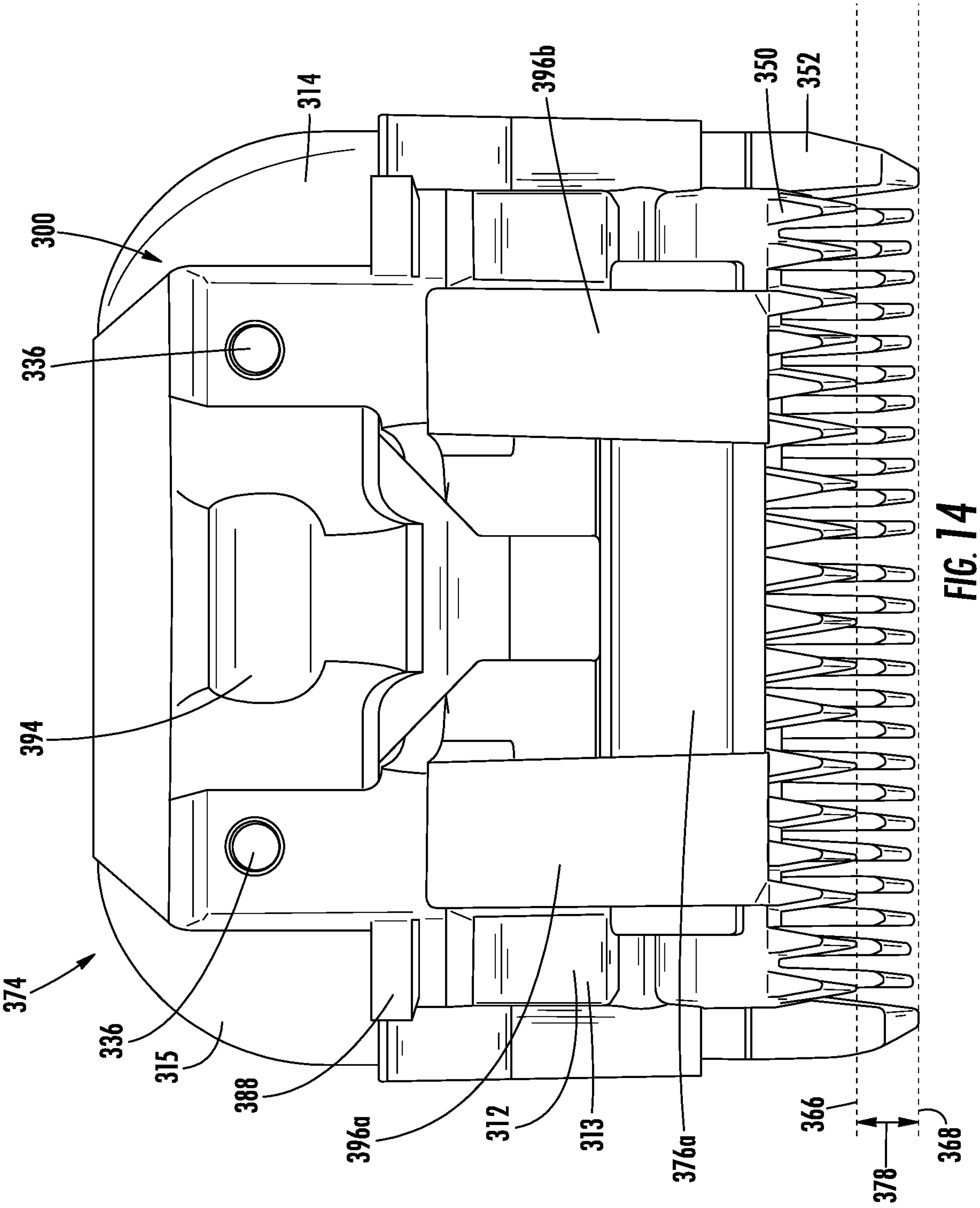
FIG. 14 is a plan view of one embodiment of the blade assembly having magnetic tensioning.

FIGS. 14-17 illustrate blade assembly 304 with magnetic tension assembly 374. Magnetic tension assembly 374 includes a first, top, or upper magnet holder 394 coupled to outer blade 314 by a fastener 336 (e.g., as shown in FIG. 14). Upper magnet holder 394 includes a pair of arms or extensions 396*a*, 396*b* that retain (or hold) a first, top, or upper magnet 376*a*. In other words, upper magnet 376*a* is fastened to extensions 396*a* and 396*b* (e.g., by an adhesive, a fastener such as a screw or bolt, etc.). Upper magnet 376*a* is illustrated as a bar magnet 376. However, in other embodiments, upper magnet 376*a* is any suitable magnet 376 or plurality of magnets 376. Extensions 396*a* and 396*b* of upper magnet holder 394 extend over inner blade 312. Upper magnet holder 394 is positioned on a side of inner blade 312 opposite the side that faces outer blade 314.

Figure 17:
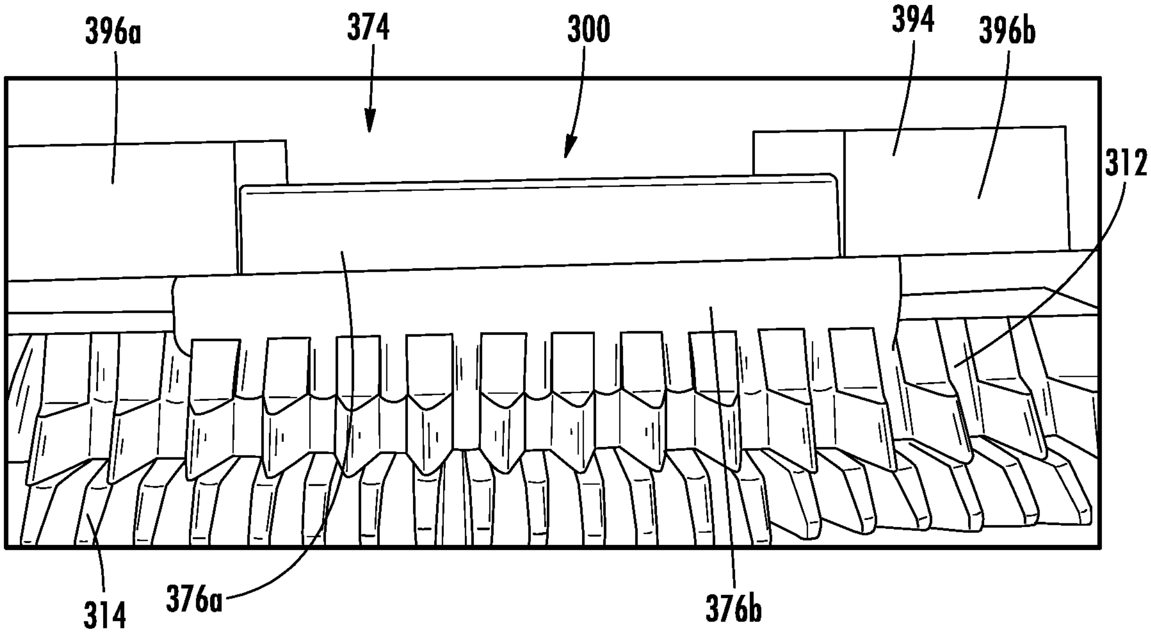
FIG. 17 is a front view of the blade assembly of FIG. 14.

Referring to FIGS. 15-17, a second, bottom, or lower magnet **376*b* is fastened to inner blade 312 (e.g., by an adhesive, a fastener such as a screw or bolt, etc.). Bottom magnet 376*b* is illustrated as a bar magnet 376*b*. However, in other embodiments, bottom magnet 376*b* is any suitable magnet 376 or plurality of magnets 376. Bottom magnet 376*b* is positioned on the side of inner blade 312 opposite the side that faces outer blade 314. Thus, upper magnet 376 and bottom magnet 376*b* are in an opposite facing relationship or orientation, opposite each other. In this configuration, upper magnet 376*a* is stationary (e.g., held by extensions 396*a* and 396*b* coupled to outer blade 314), while bottom magnet 376*b* is coupled to inner blade 312 and configured to move or oscillate with inner blade 312 during operation. Thus, bottom magnet 376*b* reciprocates with inner blade 312**.

In some embodiments, upper magnet 376 and bottom magnet **376*b* are magnets having the same polarity, such that the inner and outer blades 312 and 314 experience a repulsive force. In some embodiments, upper magnet 376 and bottom magnet 376*b* have opposite polarity, such that the inner and outer blades 312 and 314 experience an attractive force. Thus, the orientations of magnets 376*a* and 376*b* are such that they magnetically repel each other. Magnets 376*a* and 376*b* push apart or repel, with bottom magnet 376*b* pushing inner blade 312 towards outer blade 314. This generates a magnetic force that separates the blades 312 and 314 to maintain the position of inner blade edge 366 relative to outer blade edge 368 during operation to reduce frictional load and facilitate cutting. As will be described in detail below, in some embodiments, the magnetic force between inner and/or outer blades 312 and/or 314** is adjustable.

FIGS. 18-21 illustrate another embodiment of a cutter 400 with a blade assembly 404. Blade assembly 404 includes an inner blade 412 coupled to an outer blade 414. The embodiment of cutter 400 is substantially the same or similar to the embodiments of cutters 100, 200, and 300, except for the differences described. In contrast to the embodiment of cutters 100, 200, and 300, the embodiment of cutters 400 includes blade assembly 404 with alternative embodiments of magnetic tension assembly 474 and blade guide assembly 486. Blade assembly 404 is shown as coupled to an embodiment of the cutters 400. Similar components of cutter 400 are assigned the same reference number as cutter 100 beginning with 400.

In some embodiments, inner blade 412, outer blade 414, and/or Blade guide assembly 486 are magnetized to create an attractive or repulsive force between inner blade 412 and outer blade 414. For example, a magnetic assembly is located on at least one of inner blade 412, outer blade 414, or blade guide assembly 486. In other words, inner blade 412, outer blade 414, blade guide assembly 486, and/or any combination thereof, creates a magnetic field to adjust or control a tensile force (attractive or repulsive) between inner and outer blades 412 and 414. For example, a magnetized yoke is a non-conductive magnet carrier (e.g., a plastic yoke carrying a ferrous magnet 476) or conductive magnetic material. In some embodiments, a compounding force is generated from a plurality of magnets 476 with relatively weaker magnetic forces to create a compounded magnetic force from the plurality of magnets 476. A variety of magnets may be used and may reduce the total cost of the magnetic assembly. In addition, using a magnetic force to control the force between blades 412 and 414 creates a reliable and efficient method to control the tensile force generated to maintain the friction between blades 412 and 414 while cutting hair.

Figure 18:
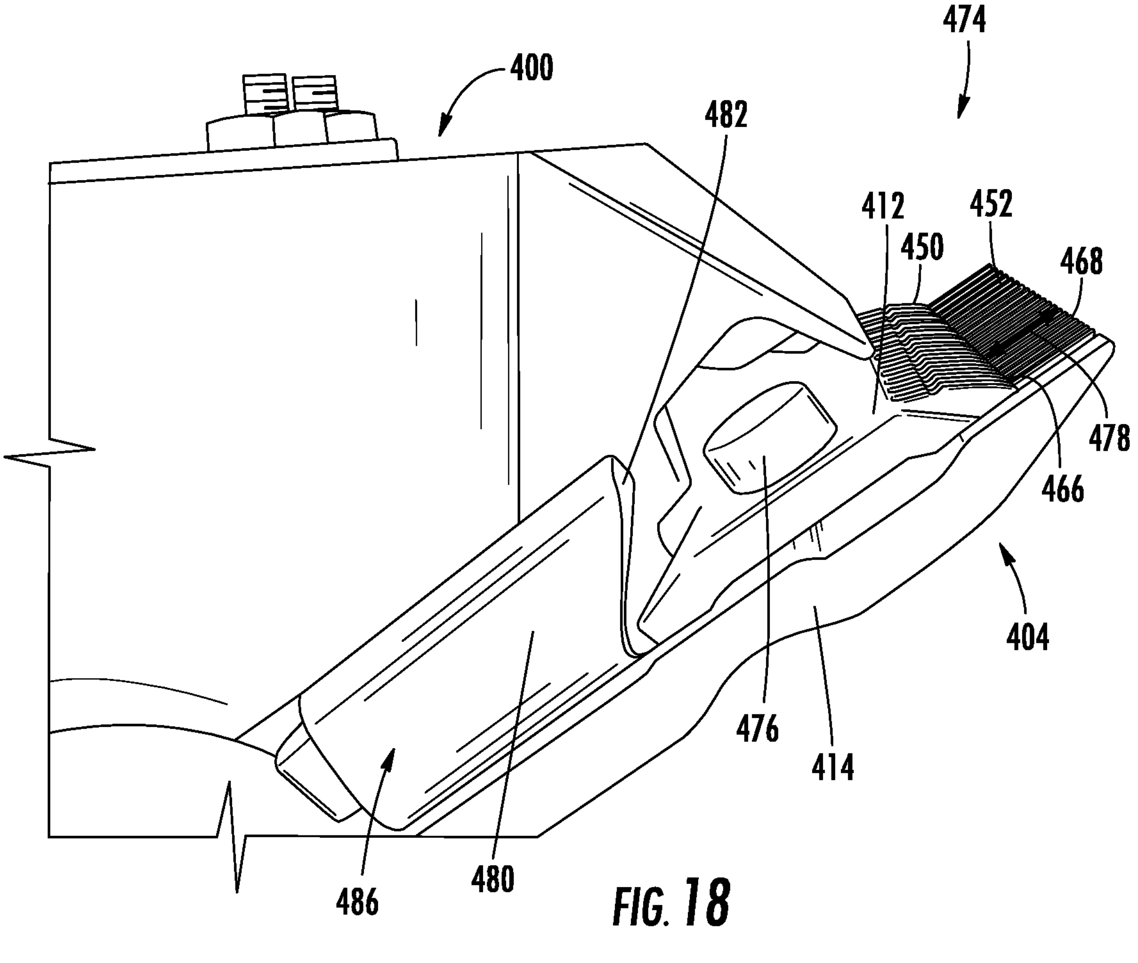
FIG. 18 is a first side view of another embodiment of the blade assembly having magnetic tensioning mounted to an embodiment of the hair cutting device.
Figure 19:
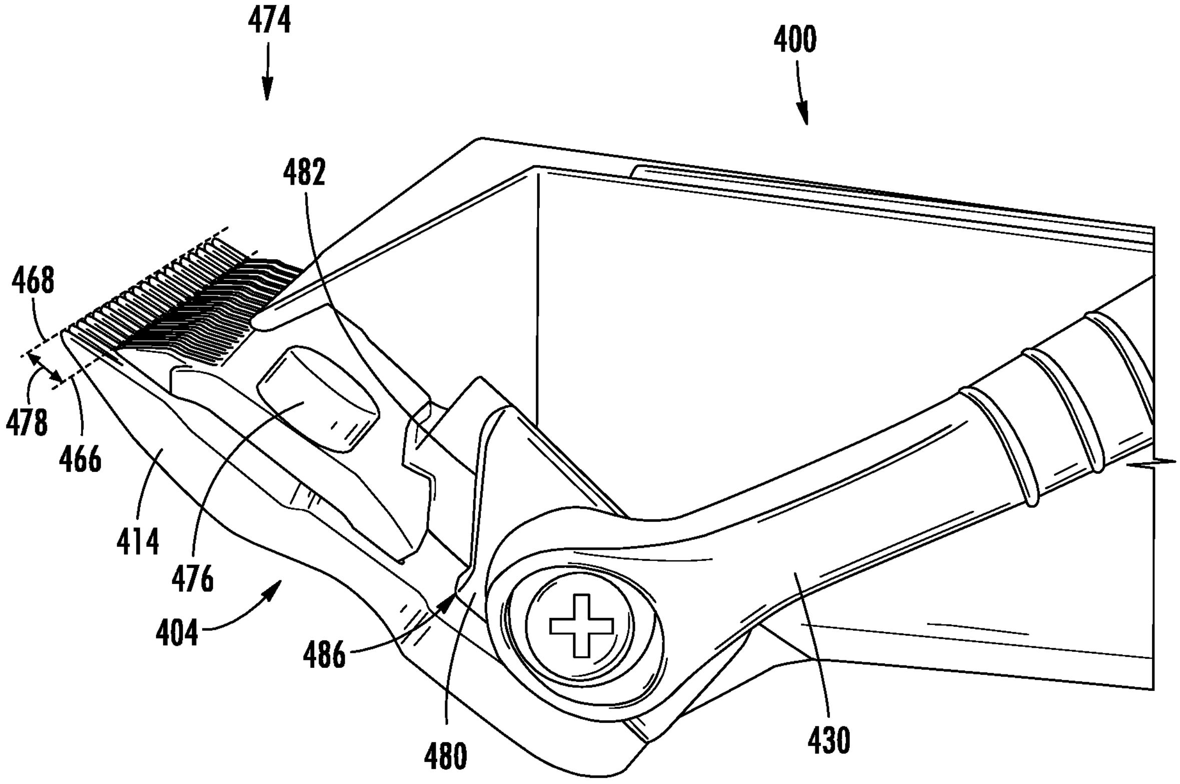
FIG. 19 is a second side view of the blade assembly of FIG. 18, opposite the side shown in FIG. 18.

FIGS. 18-19 illustrate blade guide assembly 486 with a guide member 480 that defines a guide surface 482. Blade guide assembly 486 maintains a relative position of the inner blade edge 466 relative to outer blade edge 468. Guide surface 482 is a sloped surface that is configured to engage a portion of inner blade 412. More specifically, guide surface 482 engages an end of inner blade 412 opposite inner blade edge 466 (e.g., the back end of inner blade 412). Upper blade 412 is configured to slide along guide surface 482 during reciprocation to guide the reciprocal movement of inner blade 412 relative to outer blade 414 and maintain a consistent gap 478.

FIG. 19 illustrates blade guide assembly 486 with a blade gap adjustable lever 430. In some embodiments adjustable lever 430 is similar to slider 130 and operates to change a gap 478 length. For example, rotation of adjustment lever 430 slides or translates a guide member 480 forward or backwards in a transverse direction relative to the oscillatory motion of inner blade 412. As guide member 480 moves forward, inner blade 412 also moves forward and decreases blade gap 478. As guide member 480 moves backwards, inner blade 412 also moves backward and increases blade gap 478.

Figure 20:
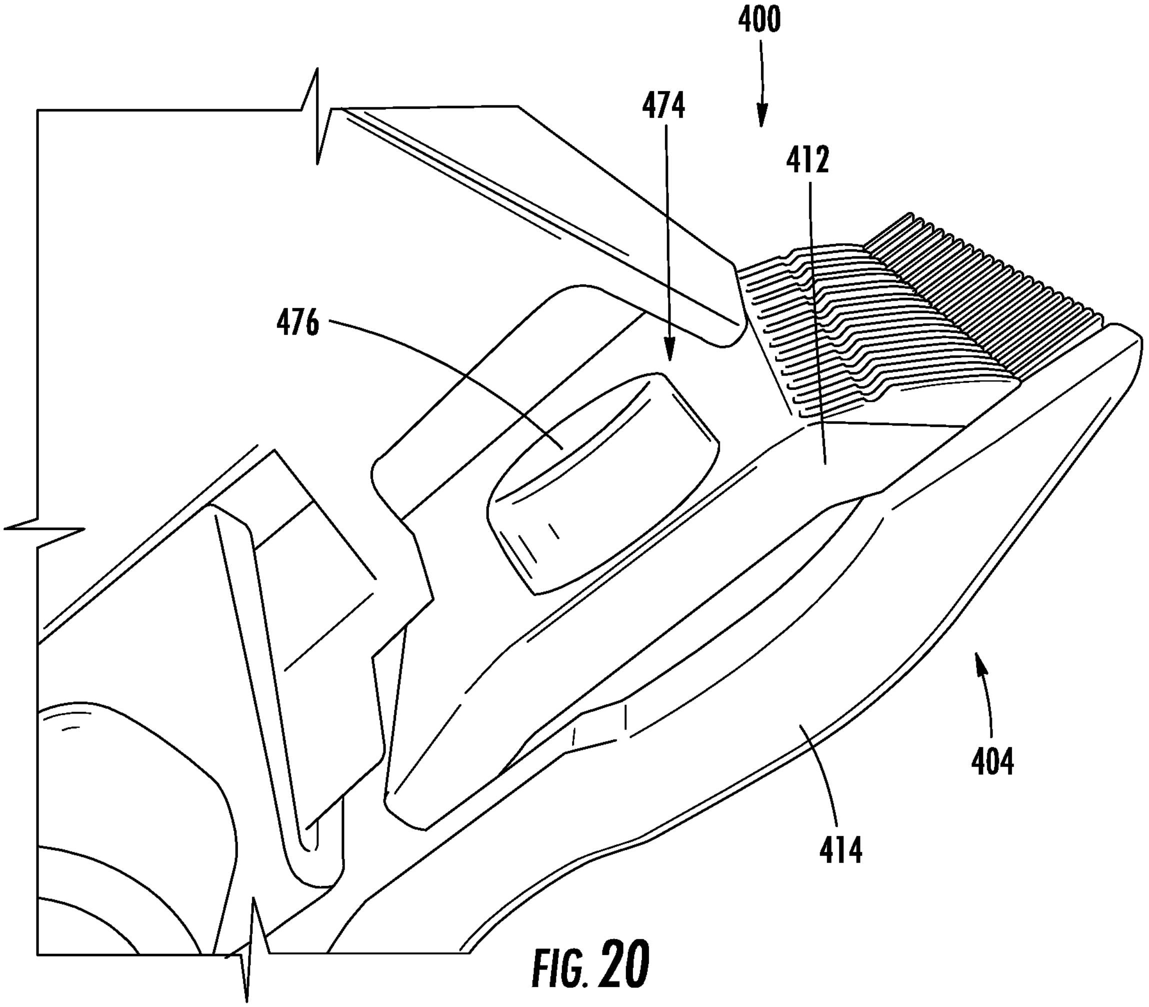
FIG. 20 is a first side view of the blade assembly of FIG. 18, further illustrating the magnetic tensioning assembly.
Figure 21:
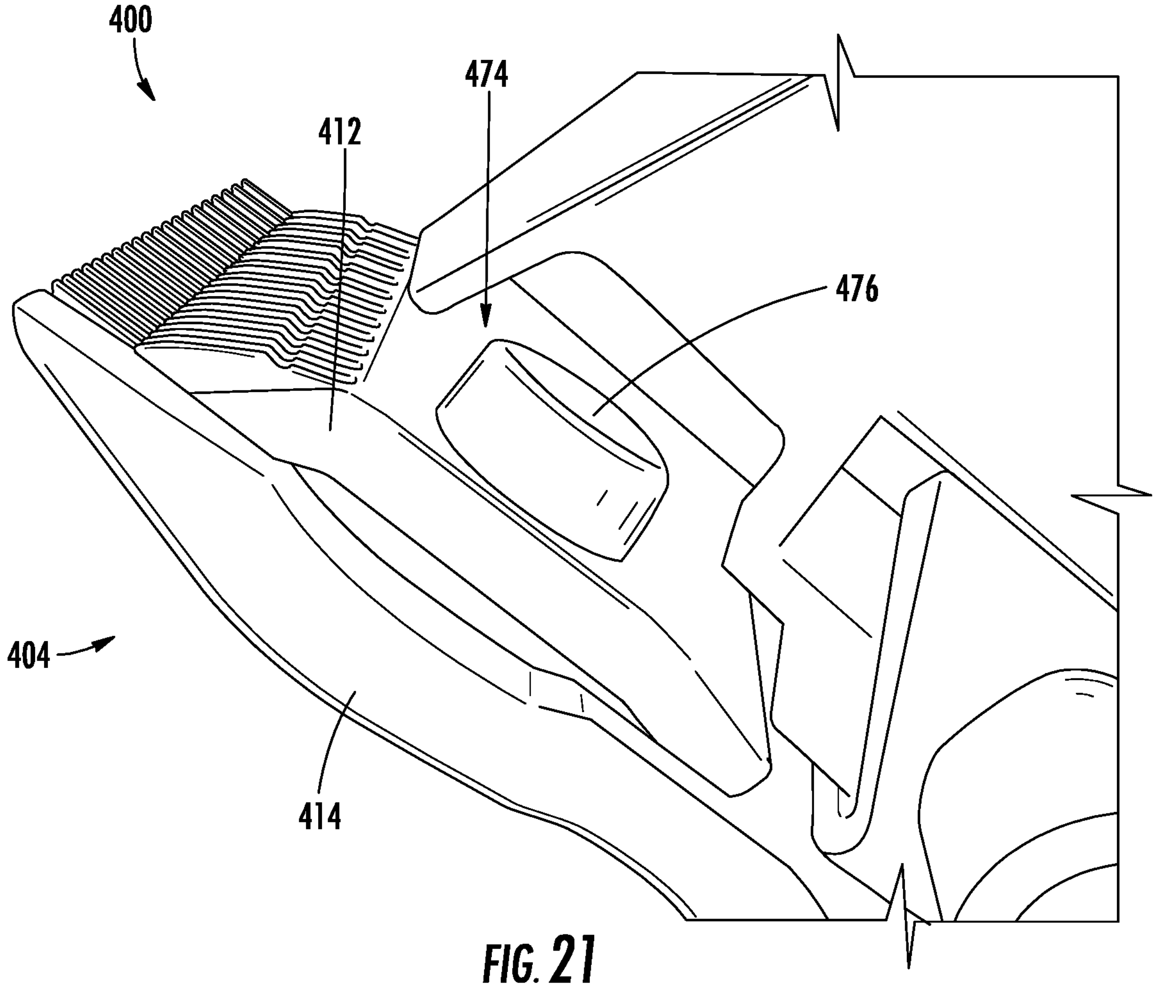
FIG. 21 is a second side view of the blade assembly of FIG. 18, opposite the side shown in FIG. 20, further illustrating the magnetic tensioning assembly.

FIGS. 20-21 illustrate magnetic tension assembly 474 of cutters 400. Magnetic tension assembly 474 includes a magnet 476, illustrated as disc magnets 476. Magnets 476 can be any suitable magnet 476 or plurality of magnets 476. Magnets 476 are positioned on the side of inner blade 412 that is opposite the side that faces outer blade 414. Magnets 476 provide a magnetic tensile force that attracts inner blade 412 towards outer blade 414. The magnetic tensile force is sufficient to draw inner blade 412 towards outer blade 414. This generates magnetic tension that maintains the position of inner blade edge 466 relative to outer blade edge 468 during operation to facilitate cutting.

In some embodiments, the magnetic tensile force between inner and/or outer blades 412 and/or 414 is adjustable. In some embodiments, the magnetic polarities are reversed, such that the magnetic force repels the inner and/or outer blades 412 and/or 414.

Figure 22:
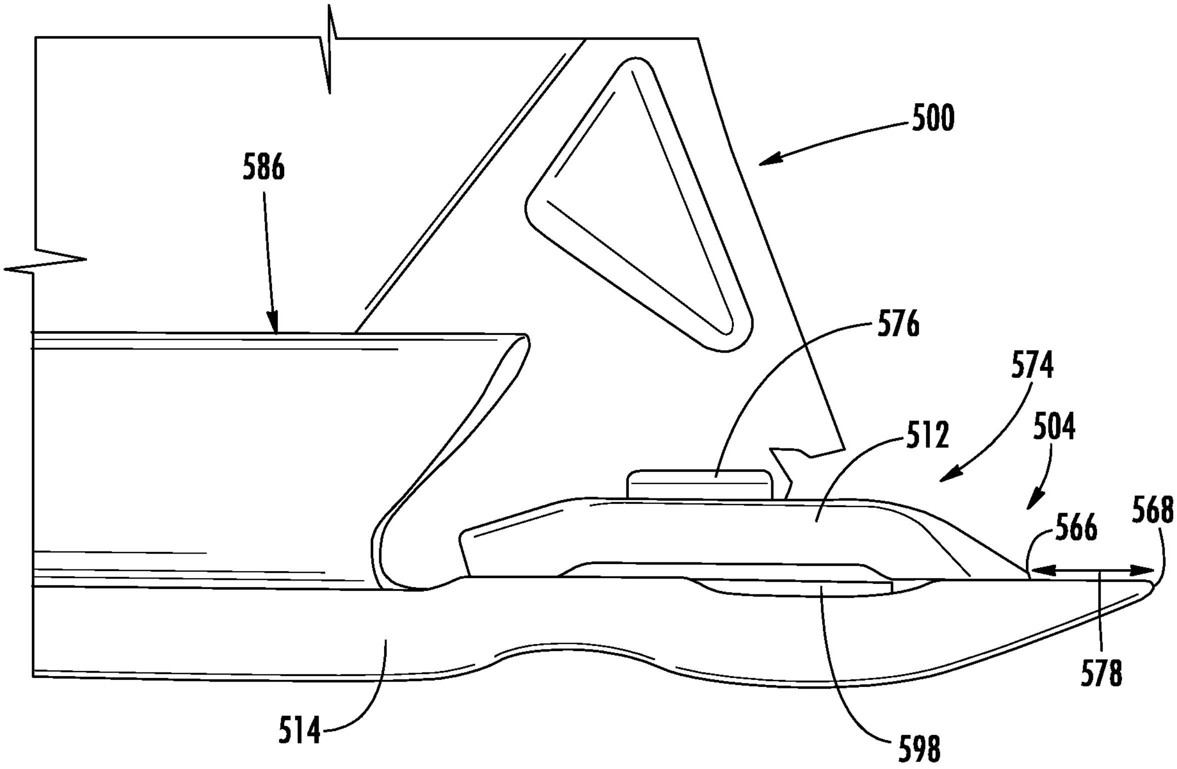
FIG. 22 is a first side view of another embodiment of the blade assembly having magnetic tensioning mounted to an embodiment of the hair cutting device.
Figure 23:
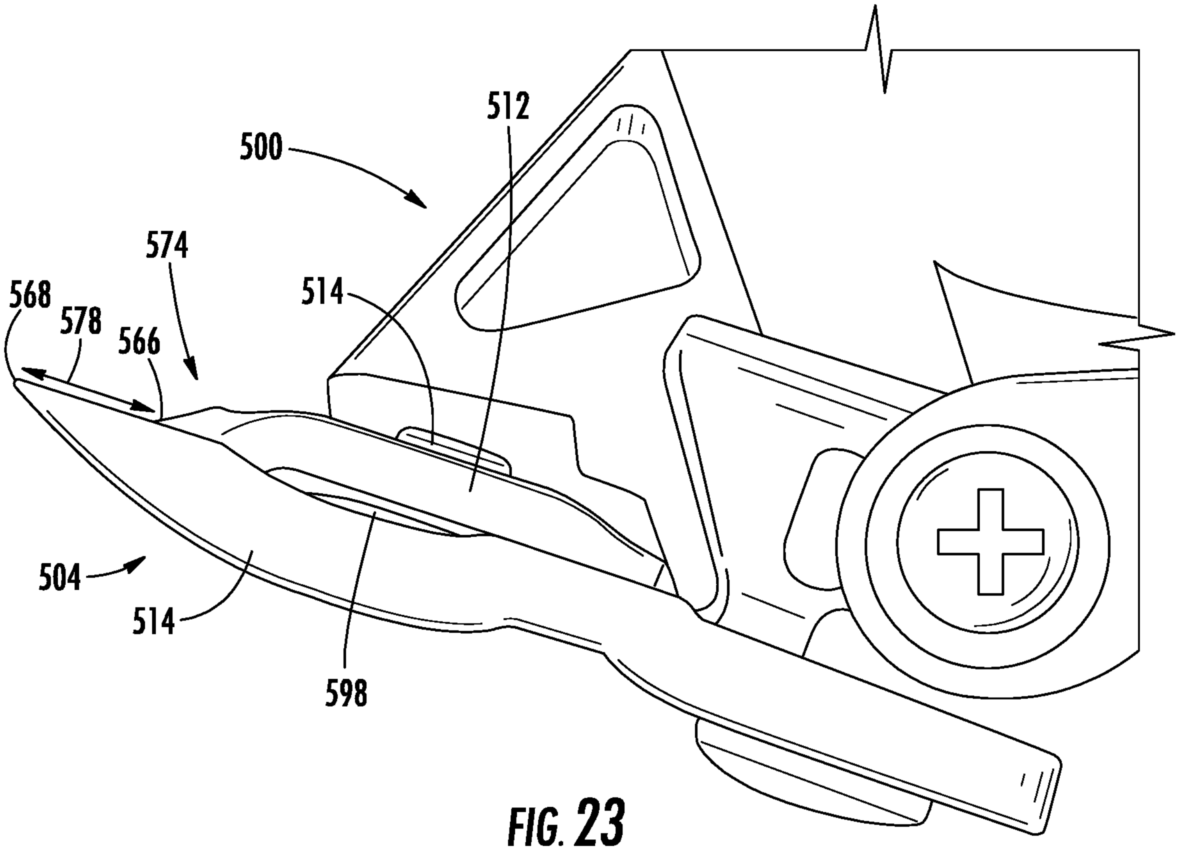
FIG. 23 is a second side view of the blade assembly of FIG. 22, opposite the side shown in FIG. 22.

FIGS. 22-23 illustrate another embodiment of a cutter 500 with a blade assembly 504. Blade assembly 504 includes an inner blade 512 and an outer blade 514. The embodiment of cutter 500 is substantially the same or similar to the embodiments of FIGS. 1-21, except for the differences described. In contrast to the embodiments of FIGS. 1-21, blade assembly 504 includes an alternative embodiment of a magnetic tension assembly 574 and blade guide assembly 586. Blade guide assembly 586 maintains a relative position of the inner blade edge 566 relative to outer blade edge 568. Blade assembly 504 is shown as coupled to an embodiment of the cutters 500. Similar components of cutter 500 are assigned the same reference number as cutters 100 beginning with 500.

In some embodiments, inner blade 512, outer blade 514 and/or Blade guide assembly 586 are magnetized to create an attractive or repulsive force between inner blade 512 and outer blade 514. For example, a magnetic assembly is located on at least one of inner blade 512, outer blade 514, or blade guide assembly 586. In other words, inner blade 512, outer blade 514, yoke 528, blade guide assembly 586, and/or any combination thereof, creates a magnetic field to adjust or control a tensile force (attractive or repulsive) between inner and outer blades 512 and 514 In some embodiments, a compounding force is generated from a plurality of magnets 576 with relatively weaker magnetic forces to create a compounded magnetic force from the plurality of magnets 576. A variety of magnets may be used and may reduce the total cost of the magnetic assembly. In addition, using a magnetic force to control the force between blades 512 and 514 creates a reliable and efficient method to control the tensile force generated to maintain the friction between blades 512 and 514 while cutting hair.

Magnetic tension assembly 574 is substantially the same as the magnetic tension assembly 474, with like numbers identifying like components. Magnetic tension assembly 574 includes a metallic member 598 coupled to outer blade 514 (e.g., an adhesive and/or fastener). Metallic member 598 is positioned on outer blade 514 and sandwiched between inner and outer blades 512 and 514. Stated another way, metallic member 598 is positioned on an internal side of outer blade 514 that faces inner blade 512, and between inner and outer blades 512 and blade 514. Metallic member 598 provides an additional surface or material that attract magnets 576. Thus, metallic member 598 engages with the attractive magnetic force emitted from magnets 576 that attracts inner blade 512 towards outer blade 514, drawing inner blade 512 towards outer blade 514. The generated magnetic tension maintains the position of inner blade edge 178 relative to outer blade edge 568 during operation. In this embodiment blades 512 and/or 514 need not be a metallic component, for example, blade 512 or 514 is a plastic or composite part.

Metallic member 598 can be any suitable ferromagnetic material or other suitable material that attracts to magnets 576 by magnetic force. In some embodiments, metallic member 598 is magnetized with the same polarity as magnets 576, such that inner and outer blades 512 and 514 are repelled. As will be described in detail below, in some embodiments, the magnetic force between inner and/or outer blades 512 and/or 514 is adjustable or scalable.

Figure 24:
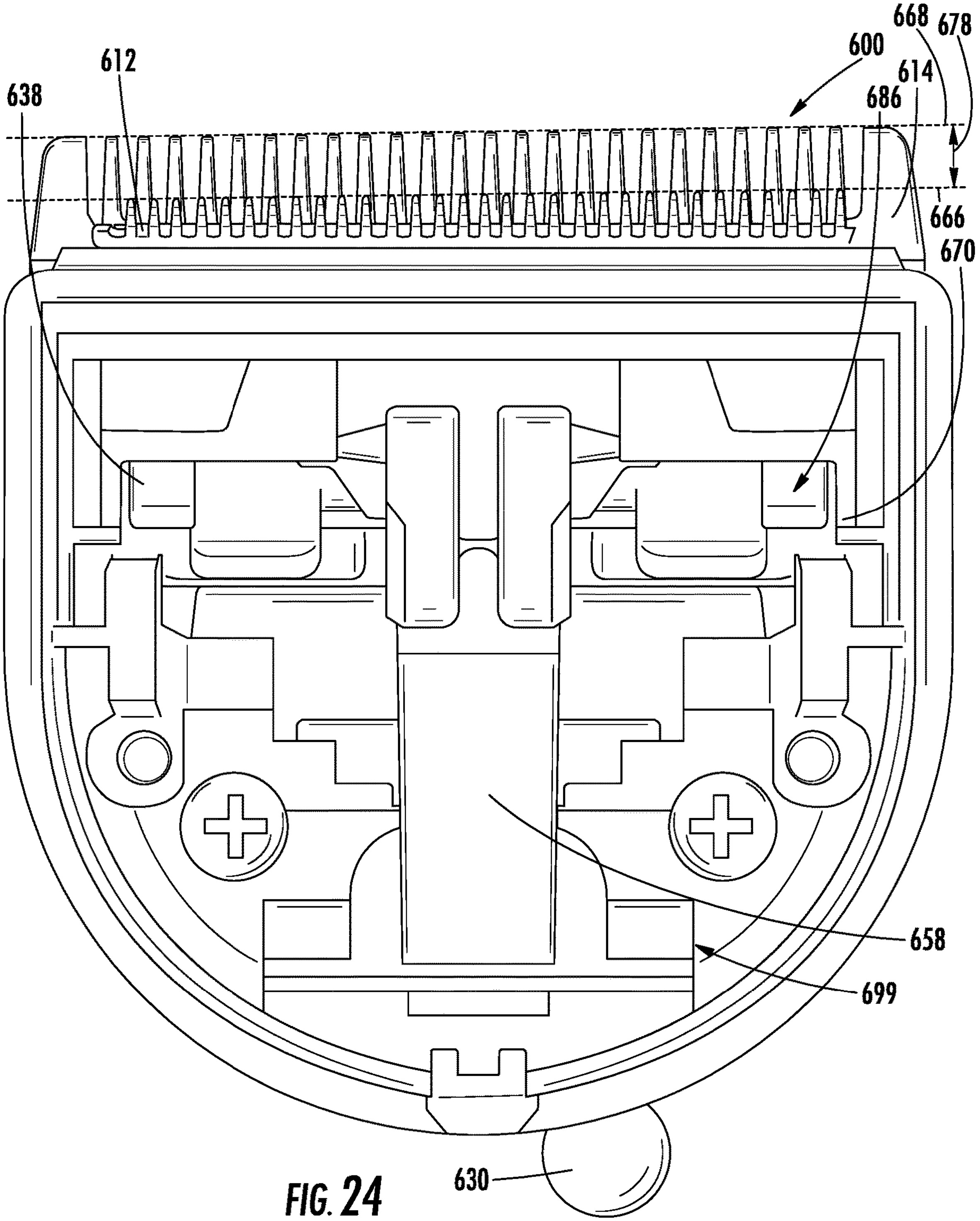
FIG. 24 is a plan view of another embodiment of the blade assembly having magnetic tensioning.
Figure 25:
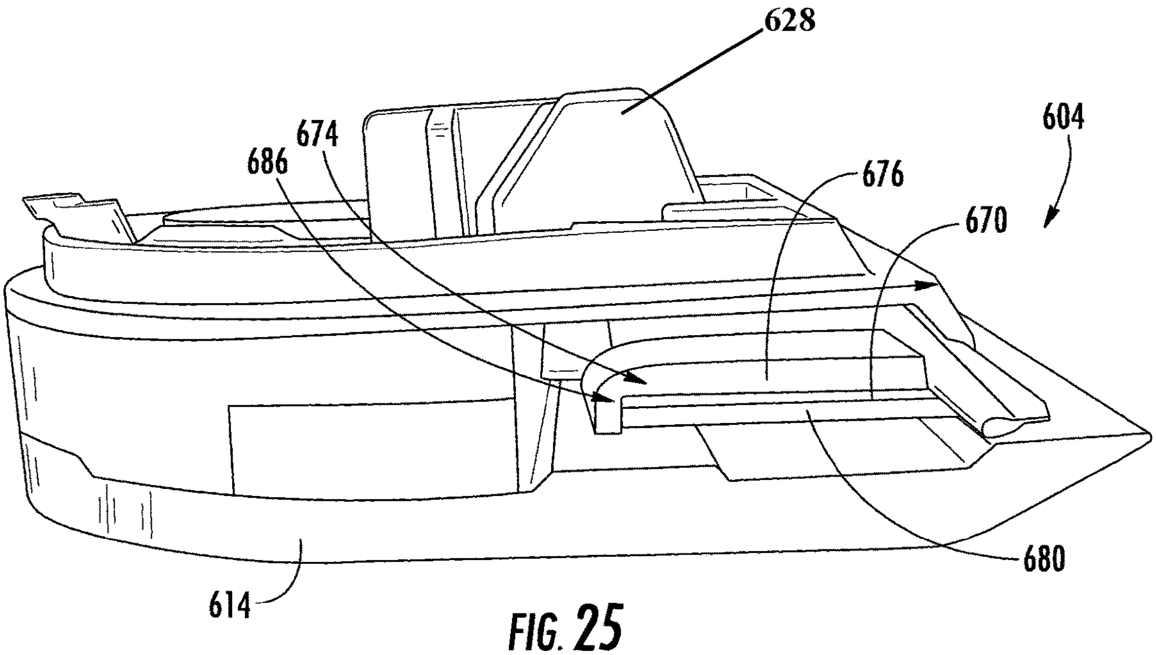
FIG. 25 is a first side view of the blade assembly of FIG. 24.
Figure 26:
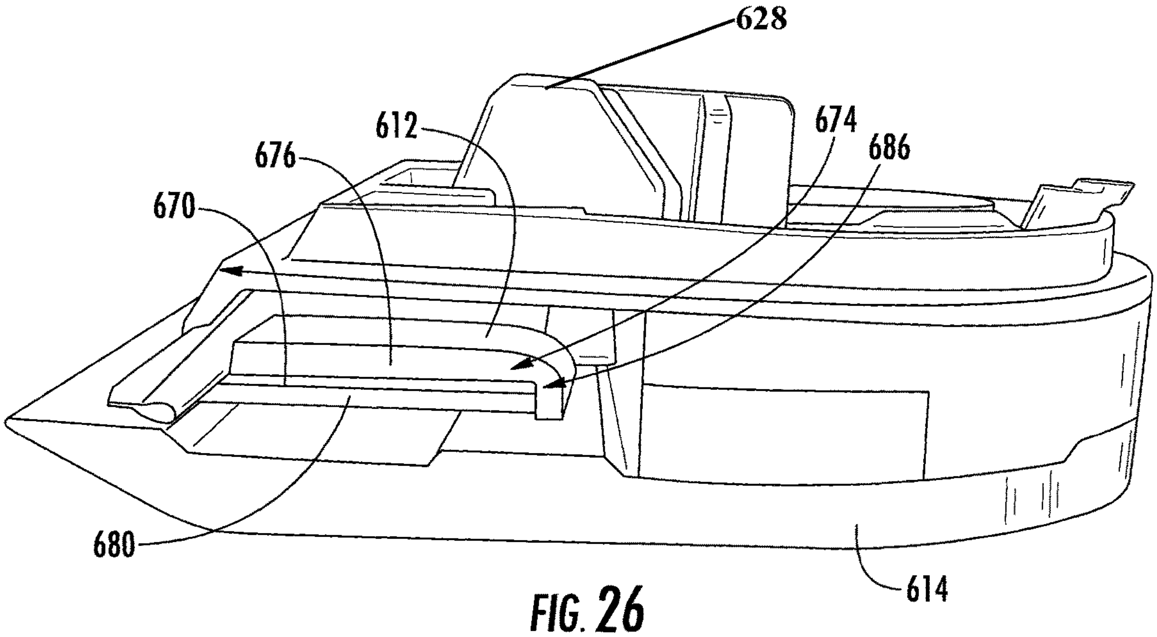
FIG. 26 is a second side view of the blade assembly of FIG. 24, opposite the side shown in FIG. 25.
Figure 27:
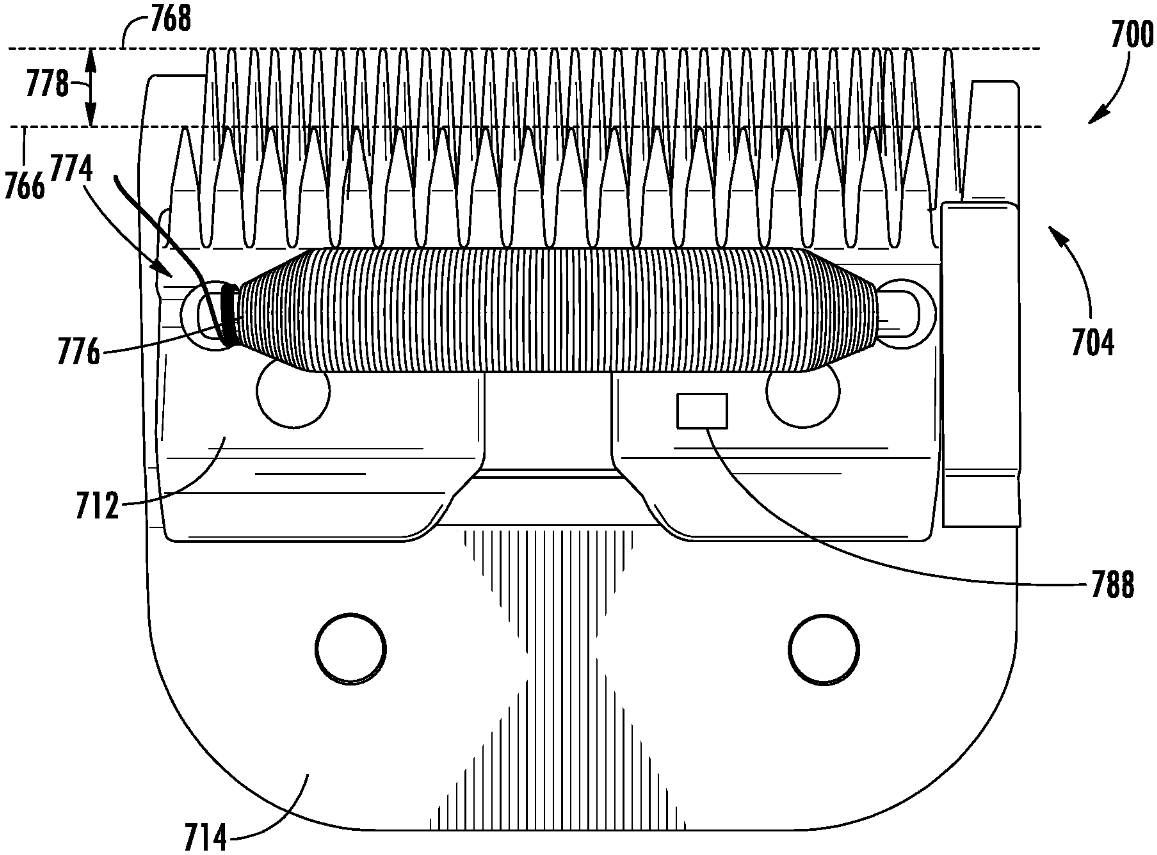
FIG. 27 is a plan view of another embodiment of the blade assembly having magnetic tensioning, and more specifically electromagnetic tensioning.

FIGS. 24-26 illustrate another embodiment of cutters 600 with blade assembly 604. Blade assembly 604 includes an inner blade 612 and an outer blade 614. The embodiment of cutter 600 is substantially the same or similar to the embodiments of FIGS. 1-23, except for the differences described. In contrast to the embodiments of FIGS. 1-23, cutters 600 include an alternative blade guide assembly 686 with an alternative embodiment of a magnetic tension assembly 674. Similar components of cutter 600 are assigned the same reference number as cutters 100 beginning with 600. As will be described in detail below, in some embodiments, the magnetic tensile force between inner and/or outer blades 612 and/or 614 is adjustable.

In some embodiments, inner blade 612, outer blade 614, yoke 628, and/or T-guide 638 are magnetized to create an attractive or repulsive force between inner blade 612 and outer blade 614. For example, a magnetic assembly is located on at least one of a yoke 628, inner blade 612, outer blade 614, or T-guide 638. In other words, inner blade 612, outer blade 614, yoke 628, T-guide 638, and/or any combination thereof, creates a magnetic field to adjust or control a tensile force (attractive or repulsive) between inner and outer blades 612 and 614. For example, a magnetized yoke 628 is a non-conductive magnet carrier (e.g., a plastic yoke 628 carrying a ferrous magnet 676) or conductive magnetic material. In some embodiments, a compounding force is generated from a plurality of magnets 676 with relatively weaker magnetic forces to create a compounded magnetic force from the plurality of magnets 676. A variety of magnets may be used and may reduce the total cost of the magnetic assembly. In addition, using a magnetic force to control the force between blades 612 and 614 creates a reliable and efficient method to control the tensile force generated to maintain the friction between blades 612 and 614 while cutting hair.

FIGS. 24-26 show blade guide assembly 686 with guide member 680. Blade guide assembly 686 maintains a relative position of the inner blade edge 666 relative to outer blade edge 668. In some embodiments, guide member 680 is the same or similar to T-guide 138. Guide member 680 is T-shaped and mounted to outer blade 614 by an adjustment assembly 699 (shown in FIG. 24). In this configuration, cross-member 670 of T-guide 638 is captured between inner and outer blades 612 and 614 and has a top side adjacent to inner blade 612 and a bottom side adjacent to outer blade 614. In some embodiments, adjustment assembly 699 includes slider 130, lever 430, and/or lever 630. Adjustment assembly 699 operates to translate inner blade 612 over outer blade 614 to increase or decrease gap 678. T-shaped guide member 680 includes a guide base 658 (the same or similar to extension arm 158) and a cross member, portion, or guide rail 638 (the same or similar to guide rail 138). An outline of guide rail 638 is shown in broken lines in FIG. 24.

Guide rail 638 is positioned between inner and outer blades 612 and 614 (FIGS. 25-26). Adjustment assembly 699 includes a lever 630 (FIG. 24) that facilitates movement of inner blade 612 relative to outer blade 614 and adjusts blade gap 678. Specifically, movement of lever 630 in a first direction generates along a base opposite lower blade edge 668 of outer blade 614 provides a translational force on guide base 658 in a direction transverse to the oscillatory direction. The translational force moves guide member 680 in a translational direction (e.g., forward). Guide member 680 translates inner blade 612 in same translational direction (e.g., forward) to increase/decrease blade gap 678. For example, movement of lever 630 in an opposite direction (e.g., backward) generates a translational force on guide base 658 that translates guide member 680 back to its original position. Guide member 680 couples to inner blade 612 to translate blade 612 in the same direction and increase or decrease blade gap 678.

FIGS. 25-26 illustrate magnetic tension assembly 674. Magnetic tension assembly 674 includes a magnet 676, illustrated as a plurality of disc magnets 676. Magnets 676 can be any suitable magnet 676 or plurality of magnets 676. Magnets 676 are positioned or coupled to guide member 680. In some embodiments Guide member 680 is the same or similar as T-guide 638. Magnets 676 are fastened to guide rail 638 of guide rail 638 and/or cross member 670. For example, magnets 676 are disc magnets 676 configured to be received in an associated aperture defined in the cross member 670 or guide rail 638. Magnets 676 are slidably received by the associated apertures and have a geometry that facilitates retention (e.g., a "top hat" geometry, etc.). In other embodiments, magnets 676 are coupled to guide rail 638 or cross member 670 (e.g., by an adhesive, fastener, etc.). Magnets 676 are positioned to face an underside of inner blade 612 or an internal side of inner blade 612 that faces guide member 680. Magnets 676 provide an attractive magnetic force that engages inner blade 612 and draws inner blade 612 towards guide member 680 (and thus towards outer blade 614). The magnetic force is sufficient to generate an attractive magnetic tension between blades 612 and 614 that maintains the position of inner blade edge 666 relative to outer blade edge 668 during operation to reduce load on motor 620 and facilitate cutting.

FIGS. 27-30 illustrate another embodiment of cutter 700 with blade assembly 704.

Blade assembly 704 includes an inner blade 712 and an outer blade 714. A blade guide assembly 786 maintains a relative position of the inner blade edge 766 relative to outer blade edge 768.

The embodiment of cutter 700 is substantially the same or similar to the embodiments of FIGS. 1-26, except for the differences described. In contrast to the embodiments of FIGS. 1-26, cutter 700 includes alternative embodiment of a magnetic tension assembly 774 that includes an electromagnet 776.

In some embodiments, inner blade 712, outer blade 714, and/or blade guide assembly 786 are magnetized to create an attractive or repulsive force between inner blade 712 and outer blade 714. For example, a magnetic assembly is located on at least one of inner blade 712, outer blade 714, or blade guide assembly 786. In other words, inner blade 712, outer blade 714, blade guide assembly 786, and/or any combination thereof, creates a magnetic field to adjust or control a tensile force (attractive or repulsive) between inner and outer blades 712 and 714. In some embodiments, a compounding force is generated from a plurality of magnets 776 with relatively weaker magnetic forces to create a compounded magnetic force from the plurality of magnets 776. A variety of magnets may be used and may reduce the total cost of the magnetic assembly. In addition, using a magnetic force to control the force between blades 712 and 714 creates a reliable and efficient method to control the tensile force generated to maintain the friction between blades 712 and 714 while cutting hair.

Figure 28:
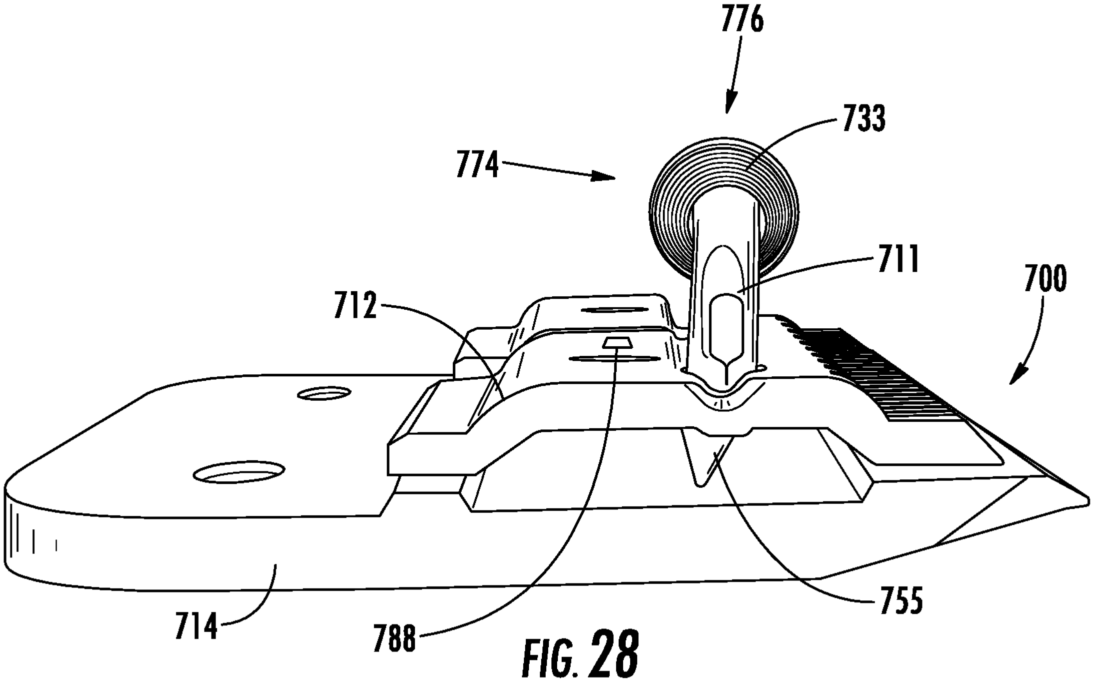
FIG. 28 is a first side view of the blade assembly of FIG. 27.
Figure 29:
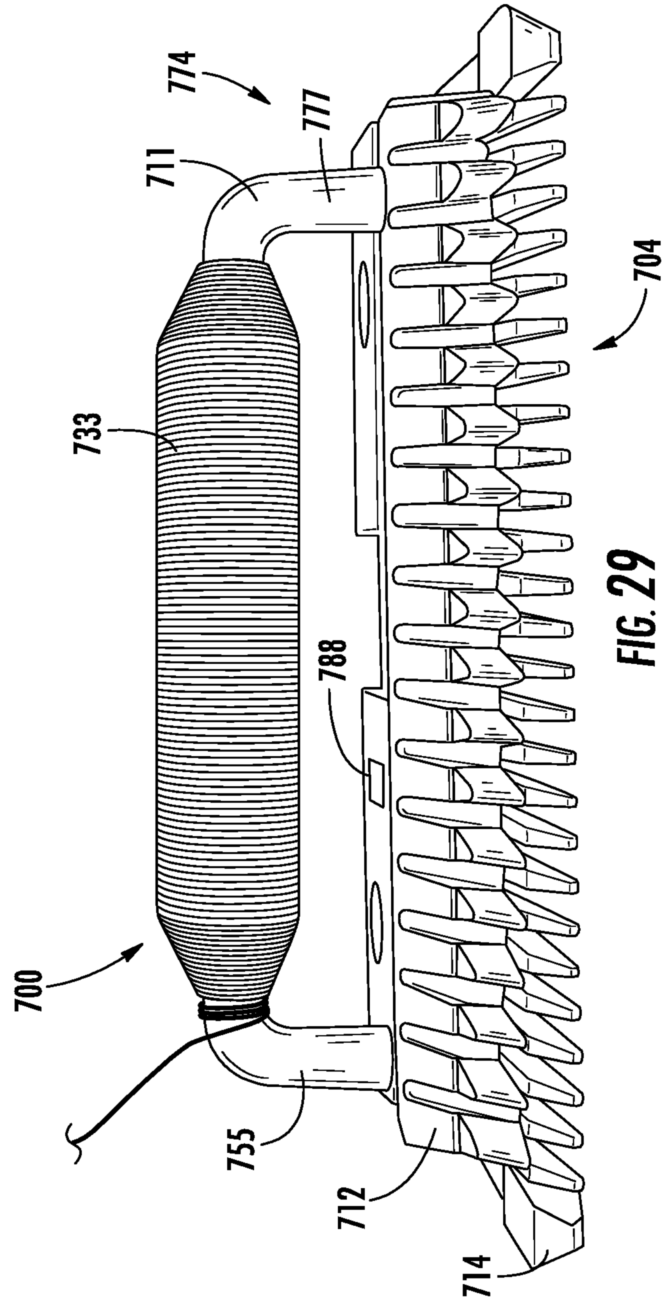
FIG. 29 is a front side view of the blade assembly of FIG. 27.
Figure 30:
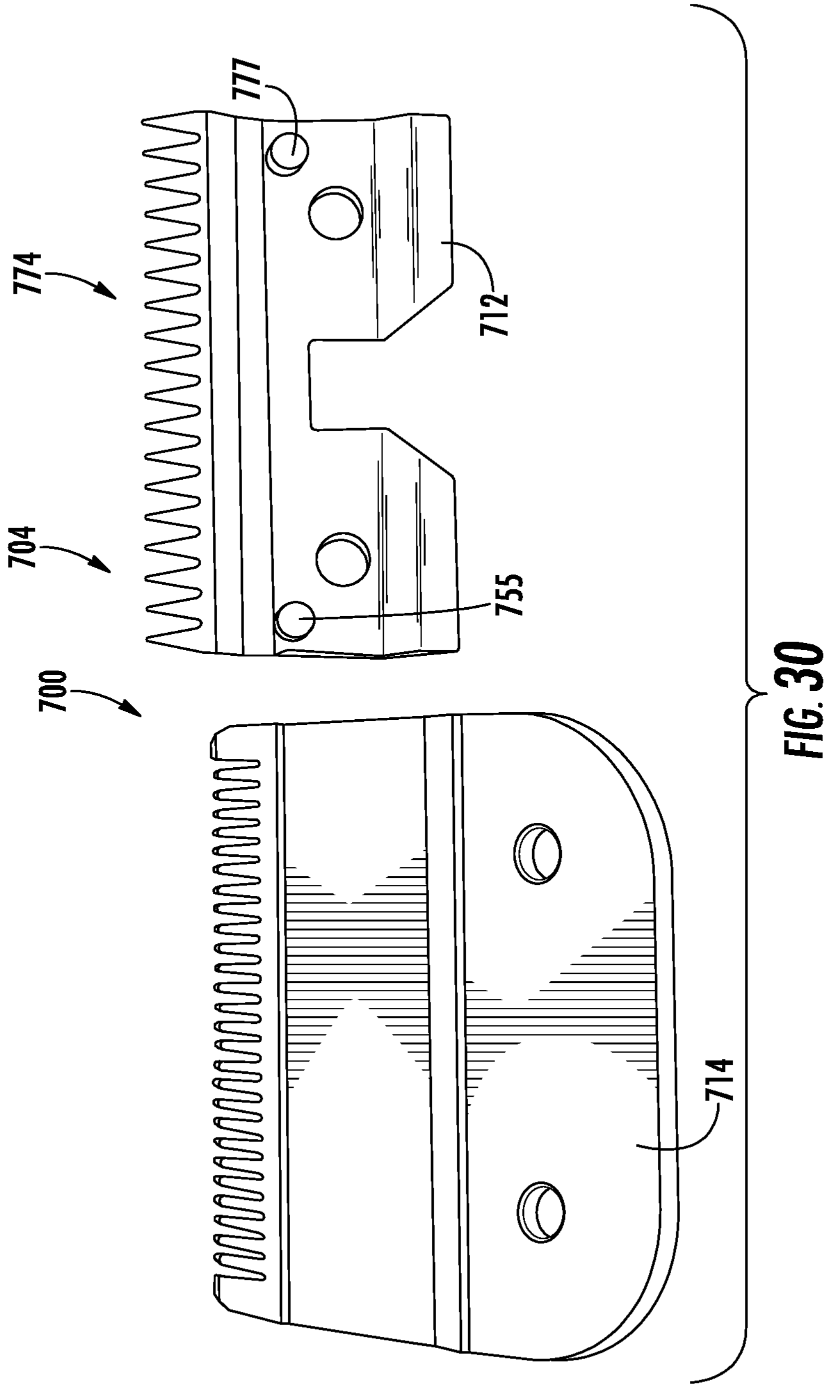
FIG. 30 is an exploded view of the blade assembly of FIG. 27.

With reference to FIGS. 28-29, electromagnet 776 includes a member 711 with windings 733. Electromagnet 776 is coupled to inner blade 712. More specifically, member 711 includes a first end 755 and a second end 777 (shown in FIG. 29). The first and second ends 755 and 777 extend through inner blade 712 and contact outer blade 714. In operation, electricity (or an electrical charge or current) is applied to windings 733 to magnetize member 711. The magnetic field extends through the first and second ends 755 and 777 to engage outer blade 714. The ends 755 and 777 concentrate a magnetic flux that provides an attractive magnetic force (e.g., tension or tensile force) that engages outer blade 714 and draws inner blade 712 towards outer blade 714. The magnetic force is sufficient to generate magnetic tension that maintains the position of inner blade edge 766 relative to outer blade edge 768 during operation. Thus, the ends 755 and 777 act as a magnetic conduit (or electromagnet) to draw inner blade 712 towards outer blade 714.

The current or voltage (or electric charge) supplied to electromagnet 776 from magnetic tension assembly 774 can be associated with operation of cutters 700. Specifically, a load sensor 788 is incorporated with cutters 700 to detect increases and/or decreases in a load on or speed of the motor. Changes in the load or speed of the motor are proportional to a frictional load or speed between blades 712 and 714. Sensor 788 sends signals indicative of load and/or speed changes on the motor to electromagnet 776 to increase or decrease the magnetic force between inner and outer blades 712 and 714. Changes in load on the motor are representative and/or proportional to the frictional load (and/or speed) between blades 712 and 714 incurred during the cutting of hair. As the detected load increases or the speed decreases, the voltage and/or current supplied to electromagnet 776 is increased to improve tension between inner blade 712 and outer blade 714. For example, when sensor 788 detects a changed load on the motor or change of speed between the motor, inner blade 712 and/or outer blade 714, sensor 788 sends a signal to electromagnet 776 to increase current in magnetic tension assembly 774 that increases the magnetic attractive or tensile force between guide member 780 and inner and outer blades 712 and 714 and reduces the frictional load and reduces the load on the motor.

Figure 31:
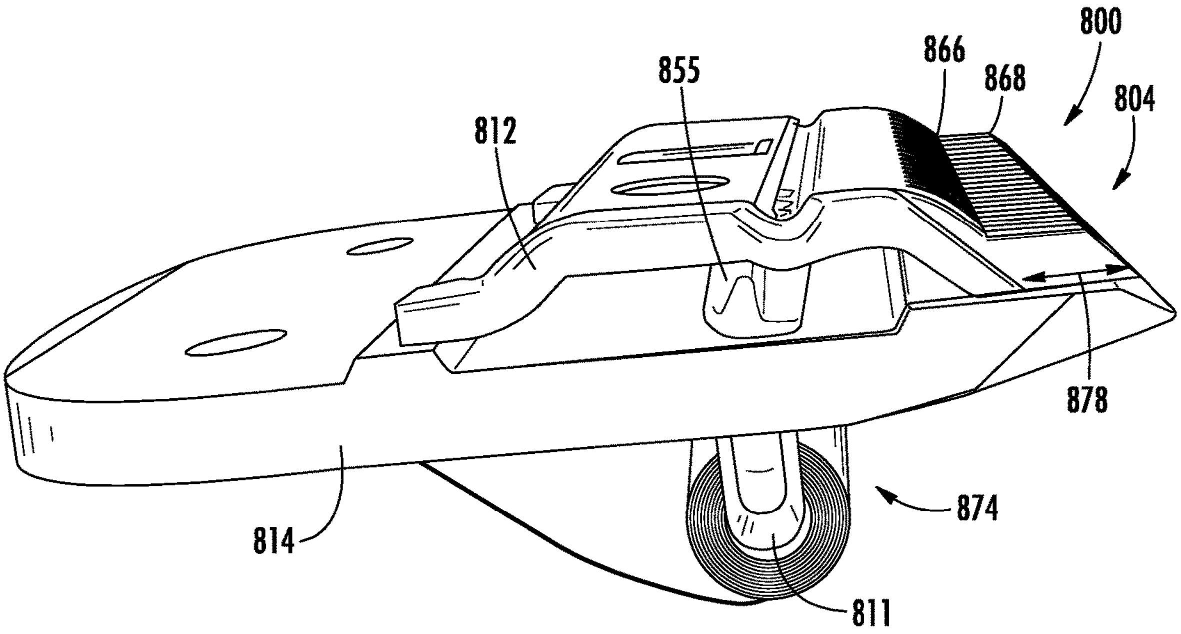
FIG. 31 is a plan view of a seventh embodiment of the blade assembly having magnetic tensioning, and more specifically an alternative embodiment of electromagnetic tensioning.
Figure 32:
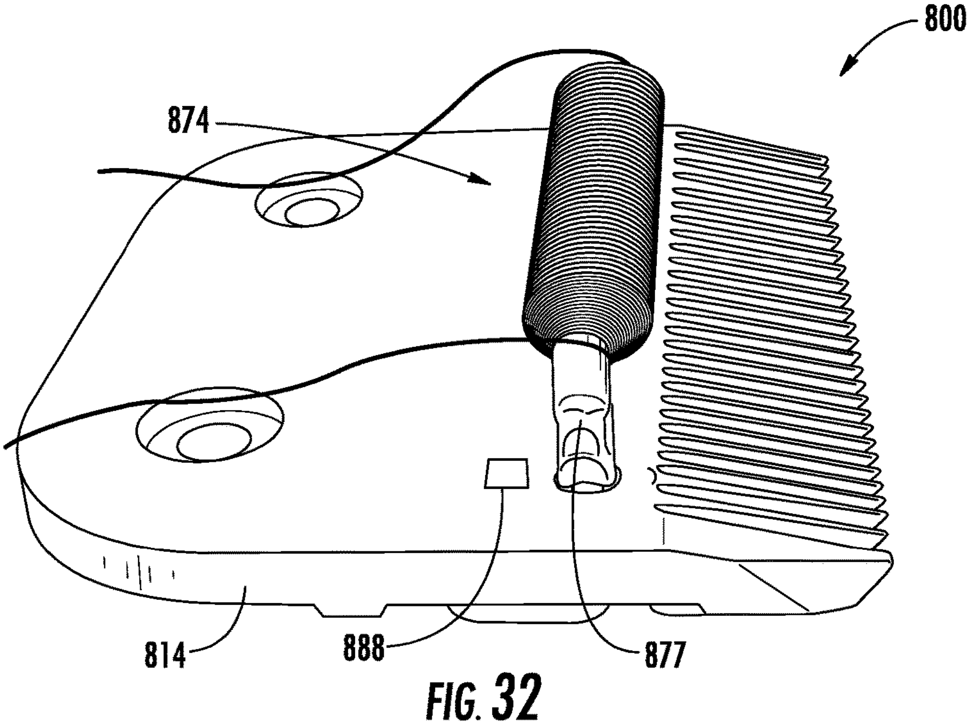
FIG. 32 is a perspective view of the outer blade of the blade assembly of FIG. 31 coupled to the electromagnet.

FIG. 31-32 illustrate another embodiment of cutters 800 with blade assembly 804.

Blade assembly 804 includes an inner blade 812 and an outer blade 814. A blade guide assembly 886 maintains a relative position of the inner blade edge 866 relative to outer blade edge 868.

The embodiment of cutter 800 is substantially the same or similar to the embodiments of FIGS. 1-30, except for the differences described. In contrast the embodiments of FIGS. 1-27, cutter 800 includes an alternative embodiment of magnetic tension assembly 874. Magnetic tension assembly 874 includes electromagnet 876 that is coupled to outer blade 814. Magnetic tension assembly 874 is substantially the same or similar as magnetic tension assembly 774 and electromagnet 776 (FIGS. 27-30), except for the differences described. In contrast to magnetic tension assembly 774, magnetic tension assembly 874 couples to outer blade (FIGS. 31-32) whereas magnetic tension assembly 774 couples to inner blade 712 (FIGS. 27-30).

In some embodiments, inner blade 812, outer blade 814, and/or blade guide assembly 886 are magnetized to create an attractive or repulsive force between inner blade 812 and outer blade 814. For example, a magnetic assembly is located on at least one of inner blade 812, outer blade 814, T-guide 838, or blade guide assembly 886. In other words, inner blade 812, outer blade 814, blade guide assembly 886, and/or any combination thereof, creates a magnetic field to adjust or control a tensile force (attractive or repulsive) between inner and outer blades 812 and 814. In some embodiments, a compounding force is generated from a plurality of magnets 876 with relatively weaker magnetic forces to create a compounded magnetic force from the plurality of magnets 876. A variety of magnets may be used and may reduce the total cost of the magnetic assembly. In addition, using a magnetic force to control the force between blades 812 and 814 creates a reliable and efficient method to control the tensile force generated to maintain the friction between blades 812 and 814 while cutting hair.

The first and second ends 855 and 877 of magnetic tension assembly 874 extend through outer blade 814 and contact inner blade 812. In operation, electricity (or an electrical charge or current) is applied to windings 833 to magnetize member 811. The magnetic field extends through the first end 855 and the second end 877 to engage inner blade 812. The ends 855 and 877 concentrate the magnetic flux to provide an attractive magnetic force (e.g., tension force) that engages and draws inner blade 812 towards outer blade 814. The magnetic force is sufficient to generate magnetic tension to maintain the position of inner blade edge 866 relative to outer blade edge 868 during operation to facilitate cutting. Thus, the ends 855 and 877 act as a magnetic conduit (or electromagnet) that draws inner blade 812 towards outer blade 814.

The current or voltage (or electricity or electric charge) supplied to electromagnet 876 from magnetic tension assembly 874 can be associated with operation of cutters 800. Specifically, a load or speed sensor 888 is incorporated with cutters 800 to detect increases and/or decreases in a load on or speed of motor 820. Changes in the load or speed of motor 820 are proportional to a frictional load between blades 812 and/or 814. Sensor 888 sends signals indicative of the load and or speed changes on motor 820 to electromagnet 876 to increase or decrease the magnetic force between inner and outer blades 812 and 814. Changes in load on motor 820 are representative and/or proportional to the frictional load between blades 812 and 814 incurred during the cutting of hair. Similarly, changes in speed of motor 820, inner and/or outer blades 812 and/or 814 are representative and/or proportional to the frictional load between blades 812 and 814. As the detected load increases or speed decreases, the voltage and/or current supplied to electromagnet 876 is increased to improve tension between inner blade 812 and outer blade 814. For example, when sensor 888 detects a changed load or speed on motor 820, sensor 888 sends a signal to electromagnet 876 to increase current in magnetic tension assembly 874 that increases the magnetic attractive or tensile force between guide member 880 and inner and/or outer blades 812 and/or 814 and reduces the frictional and motor 820 loads.

In some embodiments, electromagnet 876 is used in association with other magnets 876 (e.g., 176, 276, 376, 476, 576, 676, and 776), such as those disclosed in association with the other embodiments of magnetic tension assembly (e.g., 174, 274, 374, 474, 574, 674, and 774). Further, electromagnet 876 (and/or magnets 176, 276, 376, 476, 576, 676, and 776) can be associated with at least one sensor 888 to facilitate selective engagement (or magnetization) of electromagnet 876. For example, electromagnet 876 is associated with a proximity sensor 888 configured to detect hair, a motion sensor 888 configured to detect movement of cutters 800, and/or a sound sensor 888 configured to detect the sound of clipper operation (or motor 820 operation). In response to an associated detection by sensor 888, electromagnet 876 selectively engages electromagnet 876 (e.g., sends signals to increase or decrease a current to electromagnet 876). Thus, a magnetic force between inner blade 812 and outer blade 814 is selectively variable. Selective application of the magnetic force reduces the friction load between blades 812 and 814, the motor 820 load, and heat emitted by cutters 800, allowing the user an improved experience during use. In other words, sensor 888 communicates with electromagnet 876 to enhance overall performance and lifecycle of cutter 800.

It should be understood that the figures illustrate the exemplary embodiments in detail, and it should be understood that the present application is not limited to the details or methodology set forth in the description or illustrated in the figures. It should also be understood that the terminology is for the purpose of description only and should not be regarded as limiting.

Further modifications and alternative embodiments of various aspects of the invention will be apparent to those skilled in the art in view of this description. Accordingly, this description is to be construed as illustrative only. The construction and arrangements, shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention.

For purposes of this disclosure, the term "coupled" means the joining of two components directly or indirectly to one another. Such joining may be stationary in nature or movable in nature. Such joining may be achieved with the two members and any additional intermediate members being integrally formed as a single unitary body with one another or with the two members or the two members and any additional member being attached to one another. Such joining may be permanent in nature or alternatively may be removable or releasable in nature.

While the current application recites particular combinations of features in the claims appended hereto, various embodiments of the invention relate to any combination of any of the features described herein whether or not such combination is currently claimed, and any such combination of features may be claimed in this or future applications. Any of the features, elements, or components of any of the exemplary embodiments discussed above may be used alone or in combination with any of the features, elements, or components of any of the other embodiments discussed above.

In various exemplary embodiments, the relative dimensions, including angles, lengths and radii, as shown in the Figures are to scale. Actual measurements of the Figures will disclose relative dimensions, angles and proportions of the various exemplary embodiments. Various exemplary embodiments extend to various ranges around the absolute and relative dimensions, angles and proportions that may be determined from the Figures. Various exemplary embodiments include any combination of one or more relative dimensions or angles that may be determined from the Figures. Further, actual dimensions not expressly set out in this description can be determined by using the ratios of dimensions measured in the Figures in combination with the express dimensions set out in this description.

What is claimed is:

1. A magnetic blade assembly, comprising:

a first blade having teeth extending along a first blade edge;

a second blade having cutting teeth extending along a second blade edge parallel to the first blade edge, and supported relative to the first blade such that the cutting teeth are moveable relative to the first blade to cut hair; and a blade guide assembly comprising:

a guide member that maintains a position of the first blade edge relative to the second blade edge; and a magnetic assembly comprising at least one permanent magnet fastened to the second blade and positioned on a surface of the second blade, the surface extending from the second blade edge and facing away from the first blade;

wherein the magnetic assembly generates a tensioning force between the first blade and the second blade.

2. The magnetic blade assembly of claim 1, wherein the tensioning force is an attractive force between the first blade and the second blade.

3. The magnetic blade assembly of claim 2, wherein the at least one magnet generates the attractive force between the first blade and the second blade that orients and maintains a position of the second blade relative to the first blade.

4. The magnetic blade assembly of claim 1, wherein the at least one magnet is a disc magnet.

5. The magnetic blade assembly of claim 1, wherein a distance between the first blade edge and the second blade edge defines a blade gap, and wherein a portion of the guide member engages a back end of the second blade opposite of the second blade edge to guide the second blade over the first blade and maintain the blade gap.

6. The magnetic blade assembly of claim 5, wherein the portion of the guide member is a sloped surface.

7. The magnetic blade assembly of claim 5, wherein the blade gap is adjusted by movement of a lever coupled to the blade guide assembly.

8. The magnetic blade assembly of claim 5, wherein the at least one magnet is positioned between the second blade edge and the back end of the second blade.

9. The magnetic blade assembly of claim 1, wherein the at least one magnet is a ferrous magnet.

10. A magnetic blade assembly, comprising:

an outer blade having teeth extending along an outer blade edge;

an inner blade having cutting teeth extending along an inner blade edge parallel to the outer blade edge, the inner blade including a first side facing the outer blade and a second side opposing the first side, the second side connected to and extending from the inner blade edge; and a blade guide assembly comprising:

a guide member configured to engage a portion of the inner blade to maintain a position of the outer blade edge relative to the inner blade edge; and a magnetic assembly comprising at least one ferrous permanent magnet positioned on the second side of the inner blade;

wherein the magnetic assembly generates a tensioning force between the outer blade and the inner blade.

11. The magnetic blade assembly of claim 10, wherein the at least one ferrous magnet generates the tensioning force and wherein the tensioning force is an attractive force between the outer blade and the inner blade that orients and maintains a position of the inner blade relative to the outer blade.

12. The magnetic blade assembly of claim 10, wherein a blade gap is defined as a distance between the outer blade edge and the inner blade edge and wherein a portion of the guide member engages the inner blade at a position opposite of the inner blade edge to guide the inner blade over the outer blade and to maintain a consistent blade gap.

13. A magnetic blade assembly, comprising:

an outer blade having teeth extending along an outer blade edge;

an inner blade having cutting teeth extending along an inner blade edge parallel to the outer blade edge and supported relative to the outer blade such that the cutting teeth are moveable relative to the outer blade to cut hair, the inner blade including a first side facing the outer blade and a second side opposing the first side and facing away from the outer blade, the second side extending between the inner blade edge and an opposing back end of the inner blade; and a blade guide assembly comprising:

a guide member configured to engage a portion of the inner blade to maintain a position of the outer blade edge relative to the inner blade edge; and a magnetic assembly comprising a plurality of permanent magnets coupled to the second side of the inner blade between the inner blade edge and the back end;

wherein the magnetic assembly generates a tensioning force between the outer blade and the inner blade and wherein the tensioning force maintains a relative position of inner blade edge to outer blade edge as the inner blade moves relative to the outer blade to cut hair.

14. The magnetic blade assembly of claim 13, wherein an inner portion of the guide member engages the back end of the inner blade to translate the inner blade over the outer blade, and wherein translation of the inner blade adjusts a blade gap defined between the inner blade edge and the outer blade edge.

15. The magnetic blade assembly of claim 14, further comprising an adjustment lever, wherein, when the adjustment lever rotates, the guide member translates in a transverse direction to a direction of the translation of the inner blade over the outer blade.

16. The magnetic blade assembly of claim 13, the guide member including a portion captured between the inner blade and the outer blade.

* * * * *